United States Patent [19]
Glaze et al.

[11] Patent Number: 5,586,731
[45] Date of Patent: Dec. 24, 1996

[54] COMPOST MIXING AND AERATING APPARATUS

[75] Inventors: Bradley S. Glaze, Lyons; Kenneth R. Warner, Gladstone, both of Oreg.

[73] Assignee: Frontier Manufacturing Company, Brooks, Oreg.

[21] Appl. No.: 273,566

[22] Filed: Jul. 11, 1994

Related U.S. Application Data

[63] Continuation-in-part of Ser. No. 918,528, Jul. 21, 1992, abandoned.

[51] Int. Cl.$^6$ ............... A01B 9/00; B02C 21/02
[52] U.S. Cl. ............ 241/56; 241/101.74; 241/101.76; 241/189.1; 241/191; 241/277; 172/119
[58] Field of Search .............. 241/101.74, 101.76, 241/56, 189.1, 191, 277; 56/400; 366/325.1, 325.3, 327.1, 327.4, 329.1, 331, 345; 172/119, 122

[56] References Cited

U.S. PATENT DOCUMENTS

| | | | |
|---|---|---|---|
| 3,128,729 | 4/1964 | Henson | 56/101 |
| 3,369,797 | 2/1968 | Cobey | |
| 3,400,527 | 9/1968 | Woodring | 241/194 X |
| 3,815,823 | 6/1974 | Johnson | 241/190 X |
| 4,019,723 | 4/1977 | Urbanczyk | 366/345 X |
| 4,306,686 | 12/1981 | Urbanczyk | 241/101.7 |
| 4,360,065 | 11/1982 | Jenison et al. | 241/101.7 |
| 4,478,520 | 10/1984 | Cobey | 366/345 |
| 5,127,589 | 7/1992 | Willibald | 241/101.7 |

Primary Examiner—Timothy V. Eley
Attorney, Agent, or Firm—Marger, Johnson, McCollom & Stolowitz, P.C.

[57] ABSTRACT

An improved composting apparatus is provided which is particularly suited for use with straw-like materials. The composting apparatus includes a counter-rotating drum and paddle assembly which generates a plurality of air streams in which the composting material is entrained. The air streams rotate in a vortex like pattern within a chamber to mix and aerate the composting material. The composting apparatus is configurable for being driven sideways through fence gates and the like, and has an additional configuration for being towed without requiring a trailer.

43 Claims, 18 Drawing Sheets

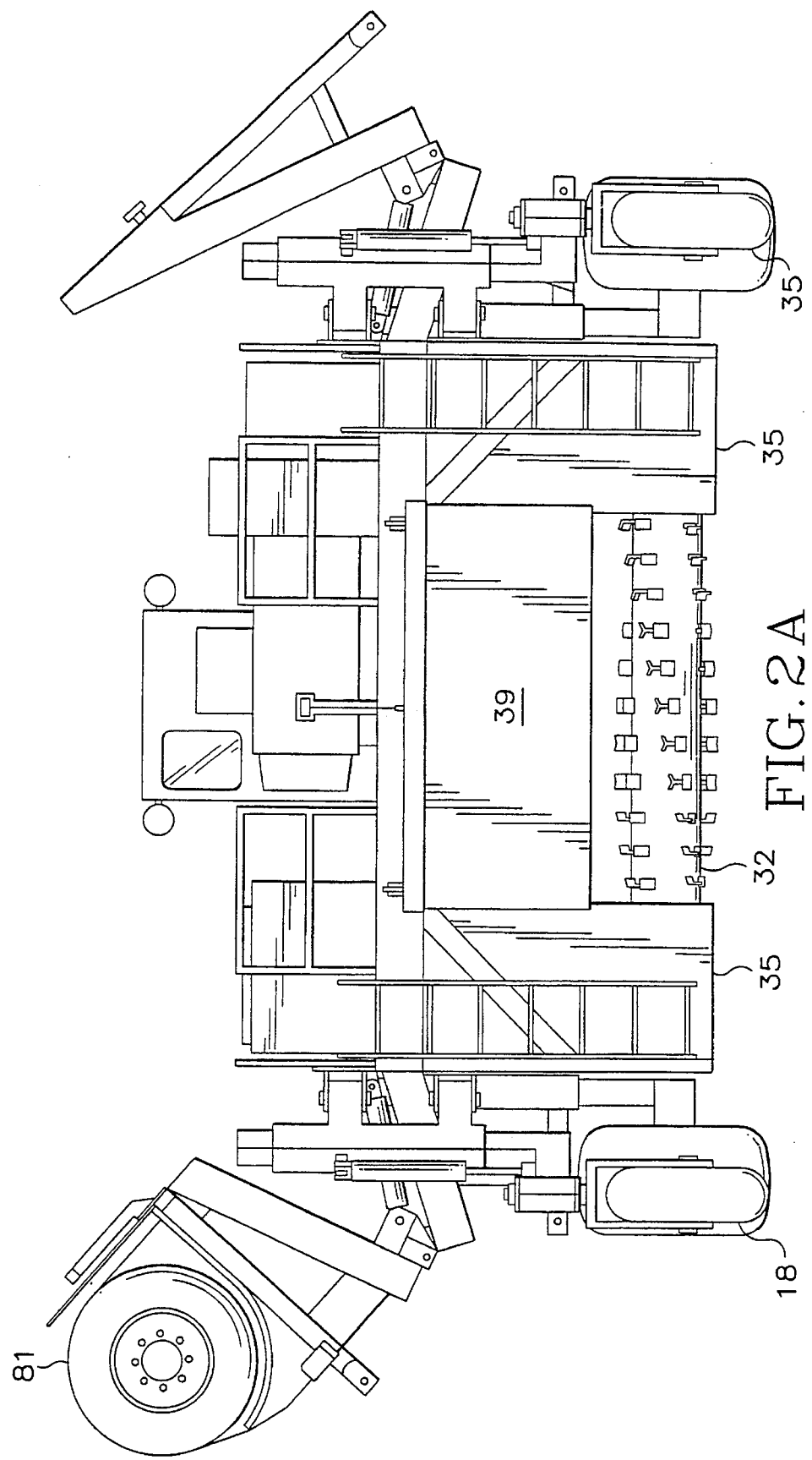

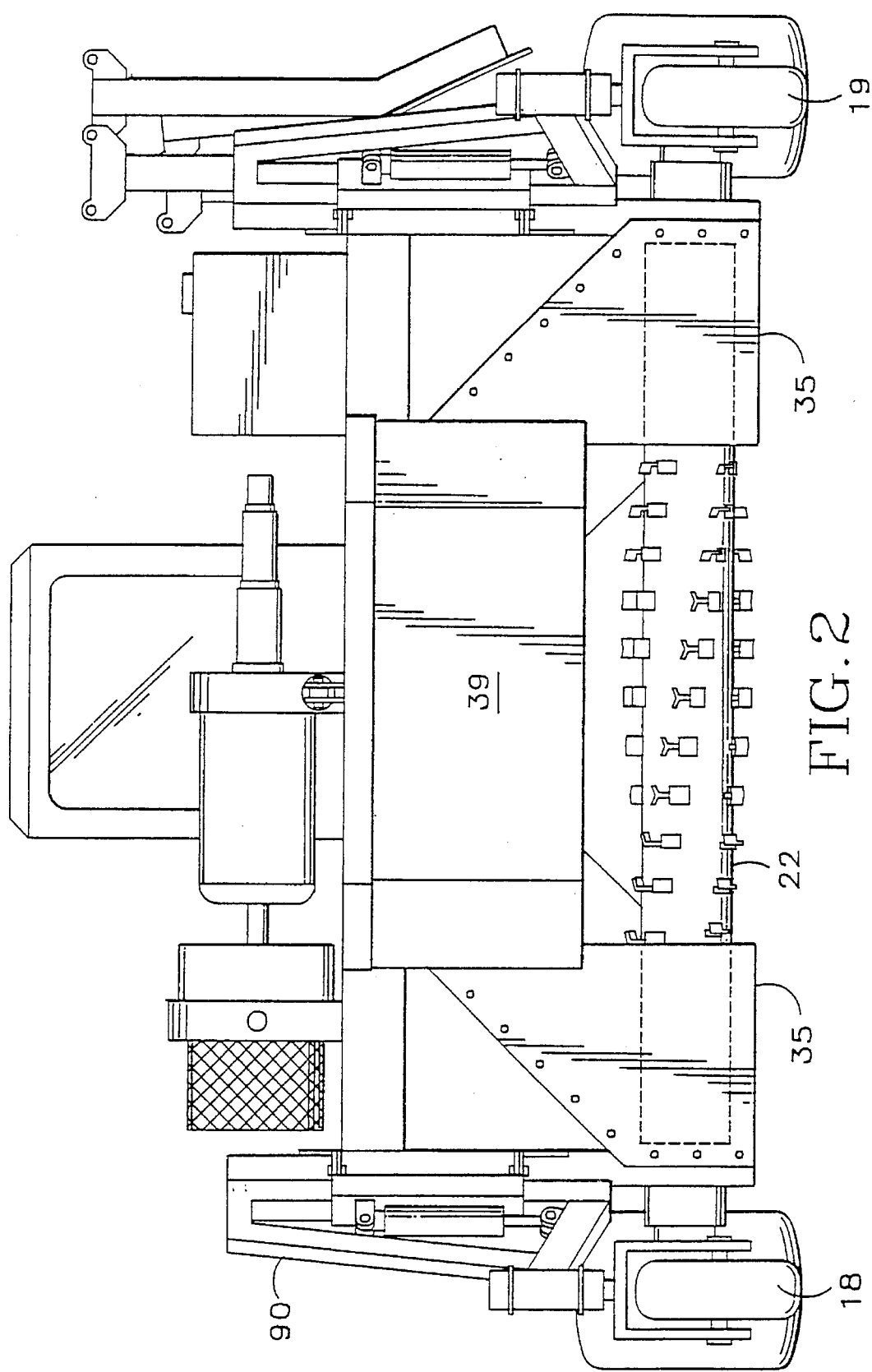

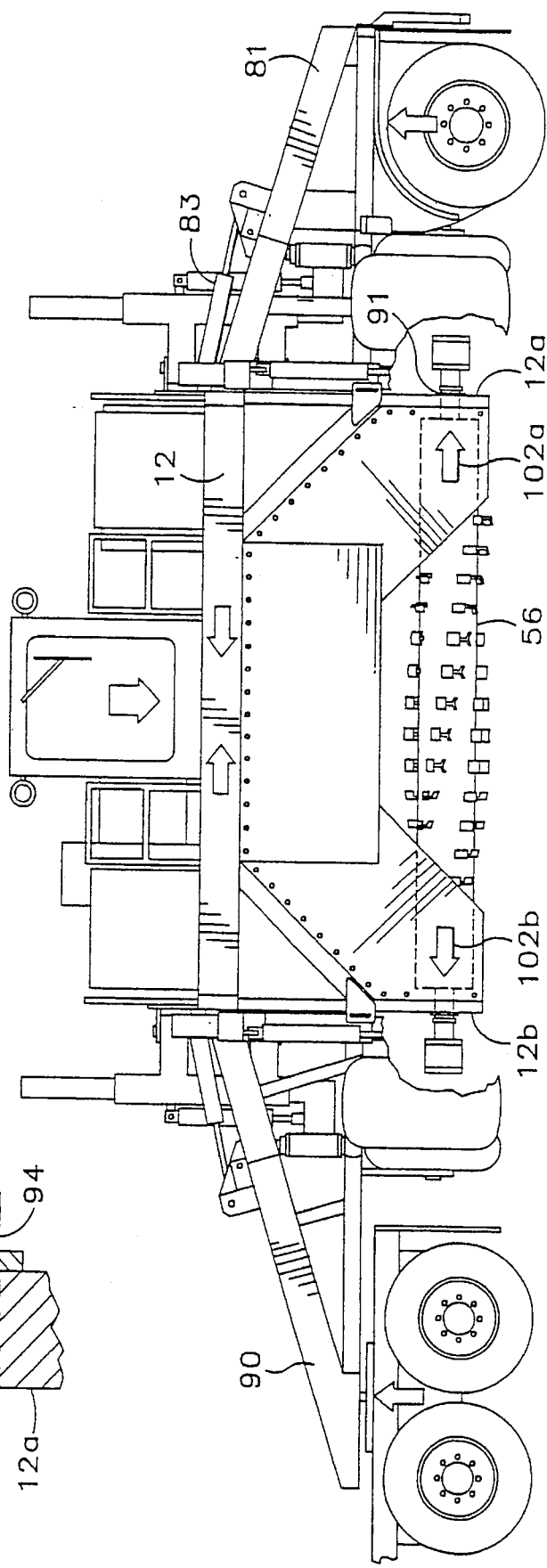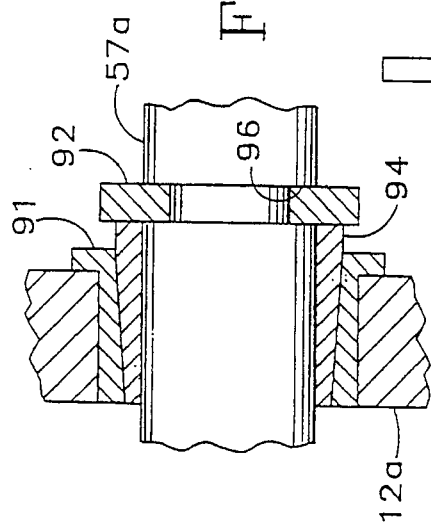
Fig. 7B
Fig. 7A

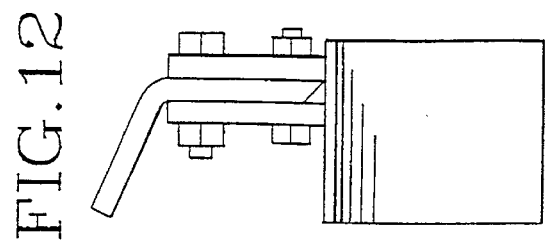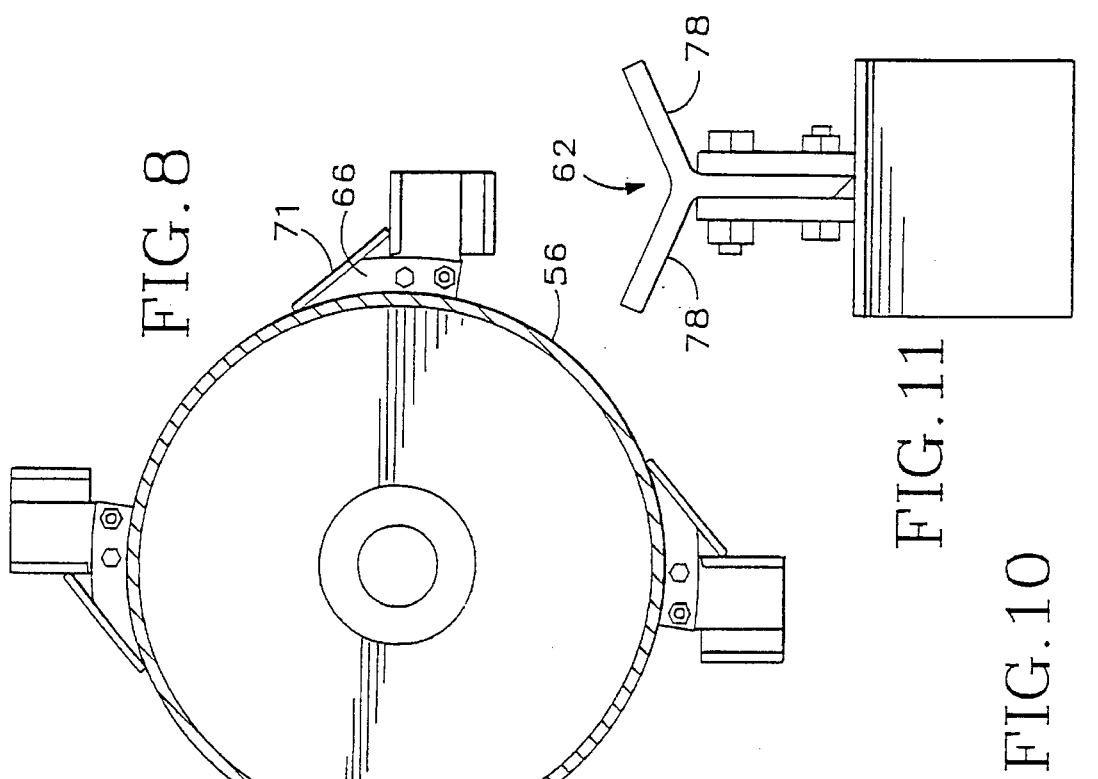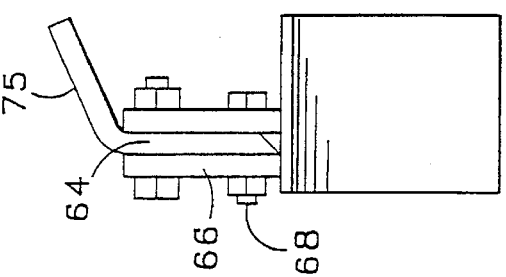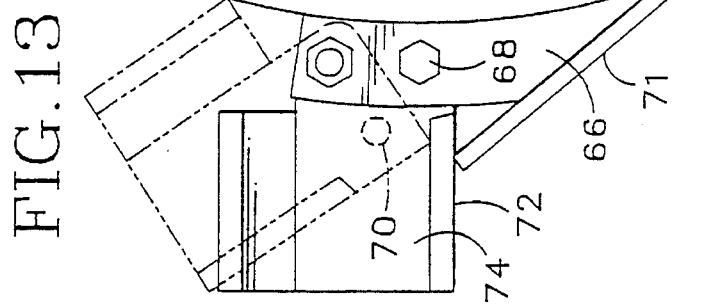

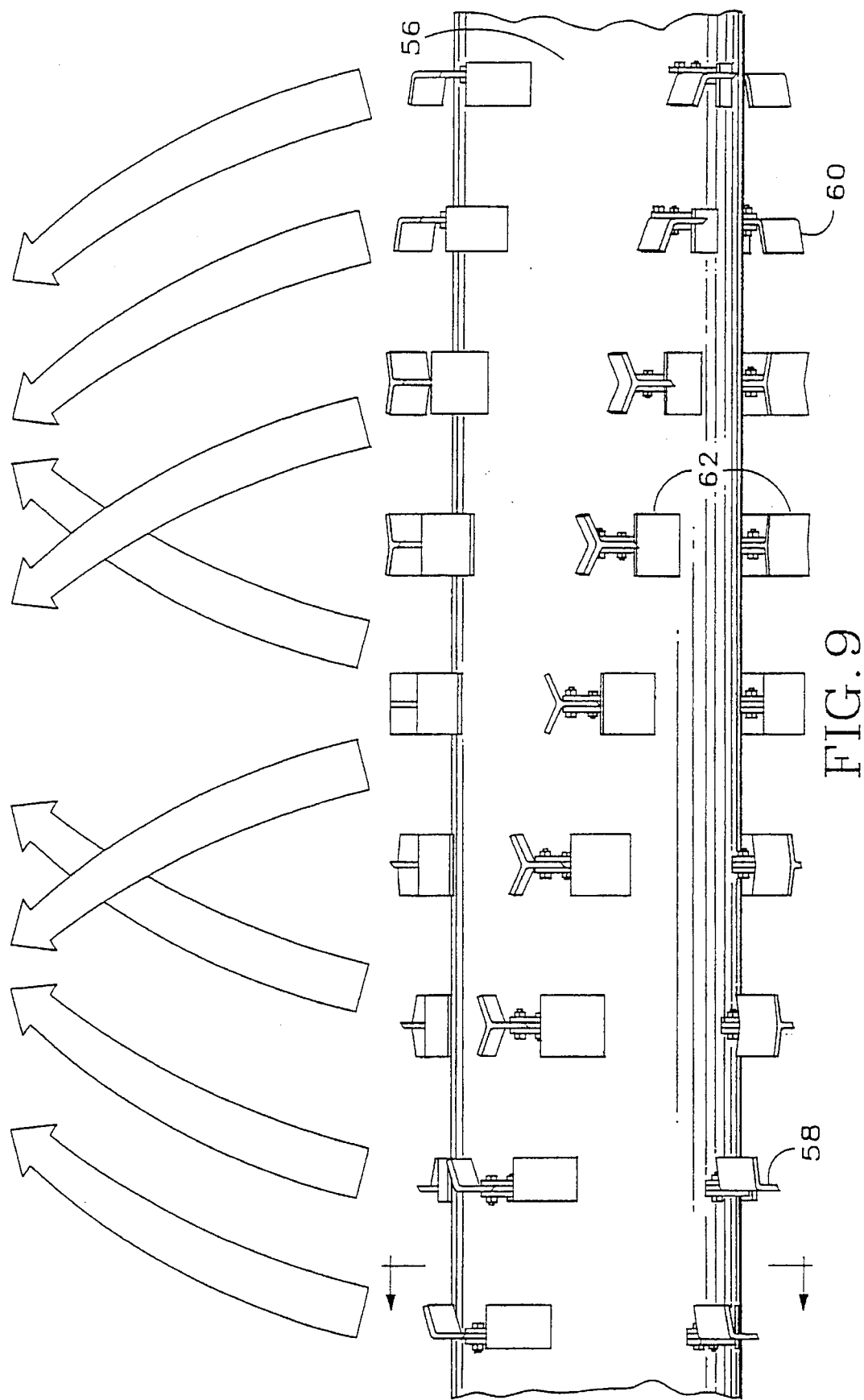

COMPOST MIXING AND AERATING APPARATUS

This is a continuation-in-part of patent application Ser. No. 07/918,528 filed Jul. 21, 1992 now abandoned.

BACKGROUND OF THE INVENTION

The present invention relates to an apparatus for mixing and aerating a composting material, and particularly to an apparatus which is suitable for use with a relatively light composting material such as straw.

Composting is a well-known method for converting solid wastes into a useful commodity. Composting of municipal waste and certain agricultural wastes is currently practiced on a relatively large scale. Composting is being considered for disposal of additional agricultural wastes as environmental regulations render traditional disposal methods unacceptable. In certain seed crop industries, grass seed for example, it has long been the practice to harvest the seed and then burn the relatively large volume of grass straw remaining. The grass seed industry is now under pressure however to abandon large scale burning of grass straw due to its effect on air quality. Similar pressures are being exerted on other segments of the agricultural industry as well. As a result, composting is receiving increasing attention as an alternative to some of the traditional agricultural waste disposal methods.

Agricultural composting in general involves the partial decomposition of a solid material by the action of aerobic bacteria. When practiced on a small scale, it is relatively easy to maintain the aerobic conditions required by the bacteria; it is much more difficult to do on a larger scale. Failure to maintain aerobic conditions throughout the composting material results in anaerobic decay of the material, which in this situation is less efficient than aerobic decomposition, and normally emits objectionable odors. This combination of undesirable characteristics provides strong incentive to maintain aerobic composting conditions at all times.

There are known machines for physically mixing compost to maintain aerobic conditions. An example is U.S. Pat. No. 4,360,065 to Jenison et al. The Jenison cultivator comprises a horizontal rotating drum having a plurality of cultivator blades in two helical rows. As the drum is rotated, the blades travel edgewise through a pile of composting material to move the material sideways and pile it in a generally triangular pile. The '065 patent further describes other composting machines such as the Scarab, sold by Scarab Manufacturing and Leasing, Inc. of White Deer, Tex. U.S. Pat. No. 3,369,797 to Cobey describes a compost turner and windrow forming machine having a transversely mounted rotating drum for the turning of compost piles and the redepositing of the turned up material in a windrow. Yet another composting apparatus is described in U.S. Pat. No. 4,019,723 to Urbanczyk. The '723 patent describes a mobile composter for manure which moves a rotating drum over masses of inoculated manure to flail it, mix it, cool it and aerate it, while moistening the particles as the same time. After being conditioned and moisturized, the material is formed into a pile by a rear outlet opening. As with the Cobey composter, the flails mounted on the drum of the Urbanczyk machine travel edgewise through the composting material for flailing and mixing. U.S. Pat. No. 4,478,520 also to Cobey describes a compost turning machine which straddles a compost windrow while carrying a rotating drum for turning the composting material. The '520 composter additionally has an adjuster auger system outboard of the rotating drum to collect additional material and deposit it in the path of the rotating drum. This is the Cobey machine referred to earlier.

These known composters are useful and effective for composting materials having a relatively high density, and which may require the addition of moisture for maintaining the proper composting conditions. However, known composting machines have proved unsuitable for use in composting relatively light, tough composting materials such as grass straw. Applicant has discovered that the unsuitability of known composting machines is due in part to their inability to throw light stringy composting materials such as straw clear of the drum to prevent the straw from fouling the drum paddles.

An additional limitation of known composting machines resides in the difficulty of transporting them from one location to another. When used in an agricultural setting, this problem is particularly acute. It may be useful for instance, to compost agricultural waste in the field where the crop is grown. Where adjacent fields are separated by a fence transporting known composting machines between fields often requires driving the machines short distances on public roads, or loading the machines onto transporters to deliver them to the adjacent fields. Commercial scale composters are so wide that they cannot be driven through standard gates and fences between adjoining fields. If the composting machine must be transported to a location other than an adjacent field the problem is further aggravated because of the width of the composting machine; it is simply too wide to be driven on a public highway. It therefore must be loaded on a low-boy type trailer, and towed to the next location.

A need therefore exists for a composting machine which is suitable for use with relatively light agricultural waste products, or relatively light composting materials of any sort, and which is readily transportable between adjacent agricultural fields, or to a remote location.

SUMMARY OF THE INVENTION

It is a principal object of the present invention to provide a mixing and aerating machine for composting a wide variety of solid materials, including relatively light agricultural wastes such as grass straw.

It is another object of the invention to provide improved mixing and aeration of relatively light composting material by entraining the composting material in a stream of air for a sufficient time to thoroughly aerate the composting material.

It is another object of the invention to generate an air stream for entraining the composting material by rapidly rotating a drum assembly having a plurality of blades protruding therefrom.

It is yet another object of the present invention to generate an air stream flowing in a generally vortex like pattern within a housing on the underside of the composting machine for thoroughly mixing and aerating the composting material. These and other objects of the present invention will be described in the following specification and the accompanying drawings.

BRIEF DESCRIPTION OF THE DRAWINGS

FIG. 2 is a rear view of a composting apparatus according to the present invention.

FIG. 2A shows a rear view of an alternative embodiment of the present invention.

FIG. 7A is a front view of a composting apparatus shown in FIGS. 1A and 2A configured for being transported by towing.

FIG. 7B is an enlarged view of the drum shaft bearing assembly.

FIG. 8 is a right side cross-sectional view of the drum and paddle assembly according to the present invention.

FIG. 9 is an enlarged sectional view of the center portion of the drum and paddle assembly, showing the counter-rotating vortex-like airstreams generated when the assembly is rotated.

FIG. 10 is a top view of a right side paddle.

FIG. 11 is a top view of a center paddle.

FIG. 12 is a top view of a left side paddle.

FIG. 13 is a side view of a right side paddle showing the shear pin feature, and showing the released paddle in phantom.

DETAILED DESCRIPTION OF THE PREFERRED EMBODIMENT

Figure 1:
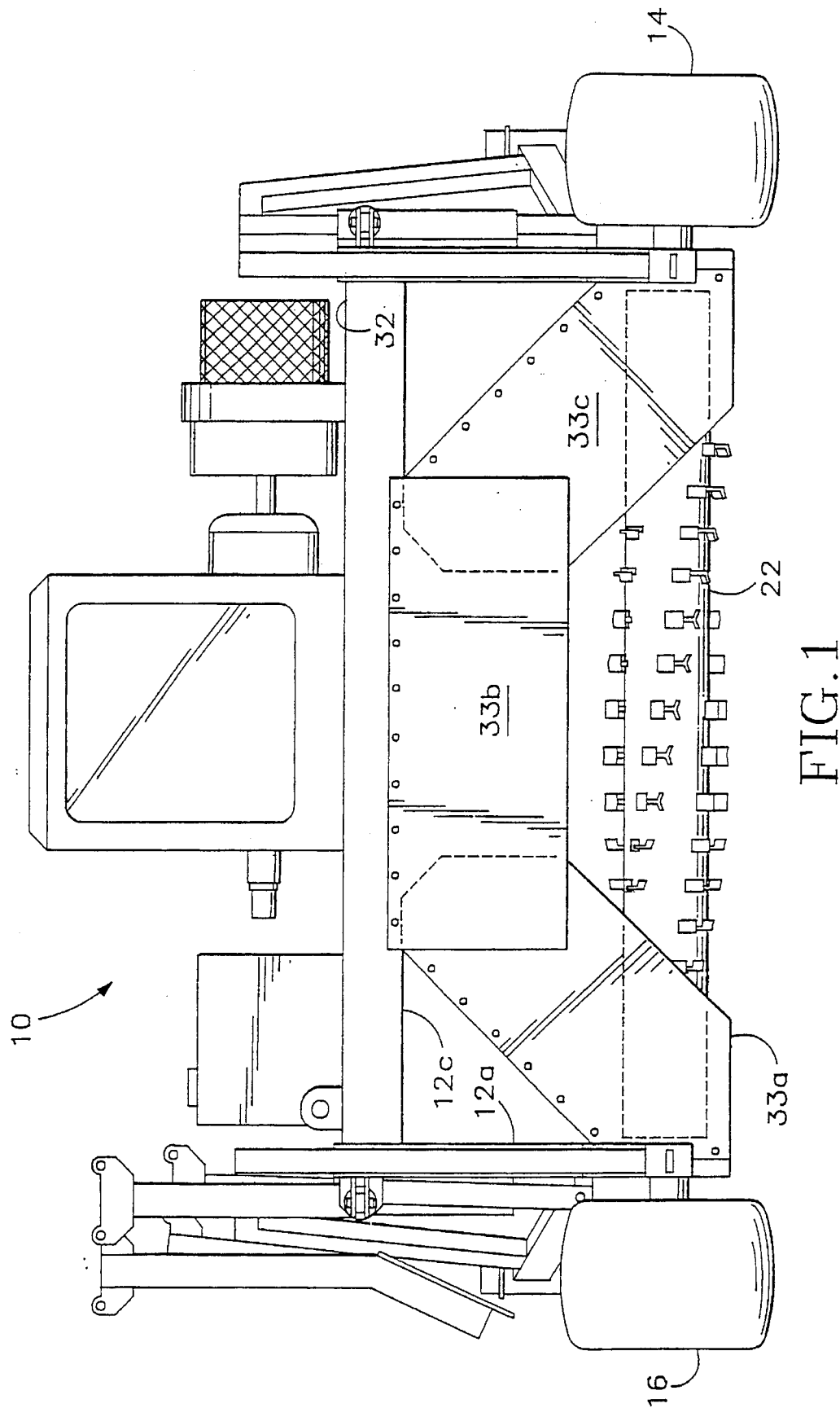
FIG. 1 shows a front view of a composting apparatus according to the present invention.
Figure 1A:
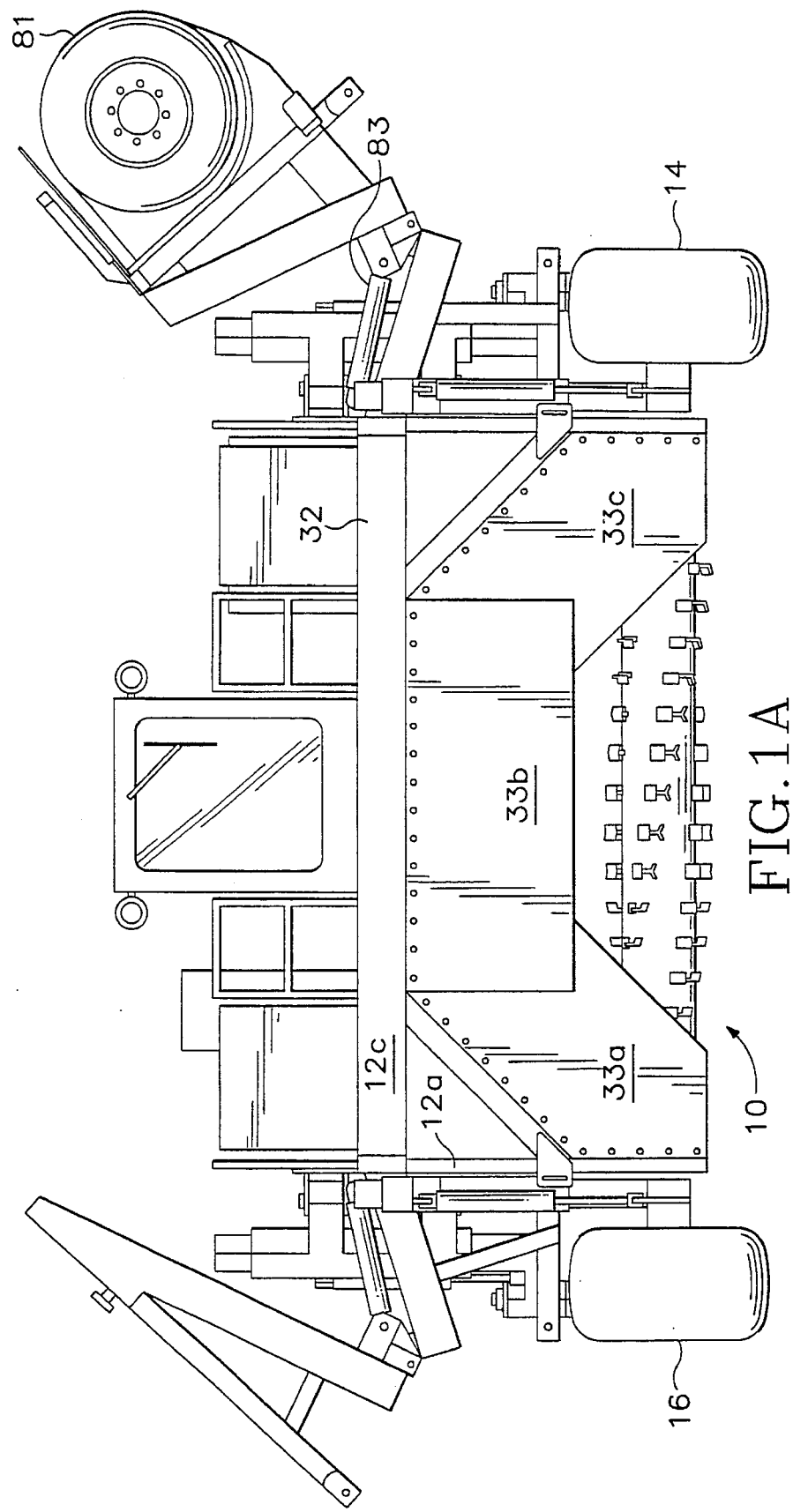
FIG. 1A shows a front view of an alternative embodiment of the present invention.
Figure 3:
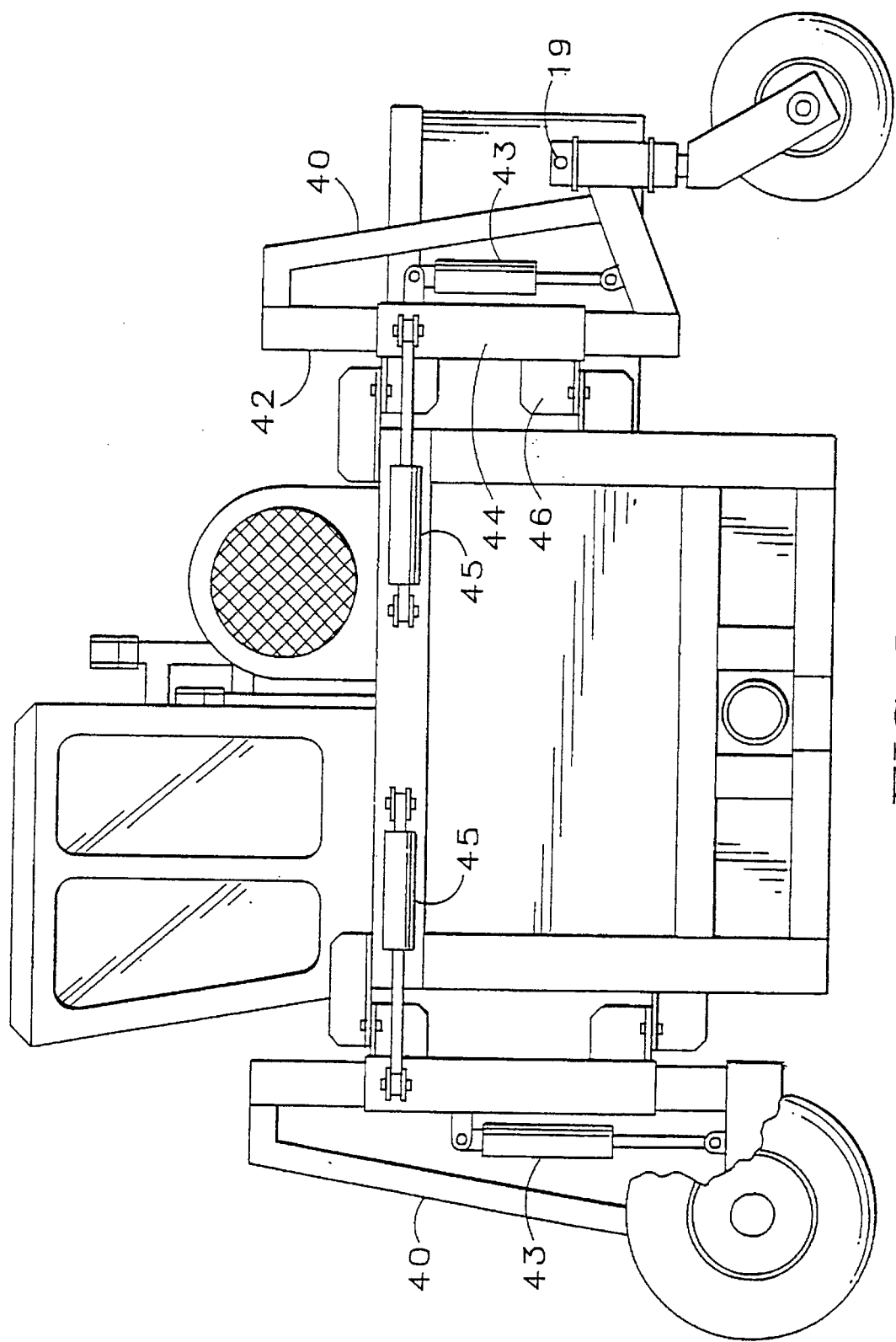
FIG. 3 is a left side view of the composting apparatus according to the present invention as shown in FIGS. 1 and 2.

Referring now to FIGS. 1 and 2, a first embodiment of a composter according to the present invention is shown generally at 10. A second embodiment is shown in FIGS. 1A and 2A which differs in detail as described below. Composter 10 includes frame 12 which is assembled from ladder-type left, right, and top subframes, 12a, 12b and 12c respectively. Frame 12 is supported at its front end by left and right drive wheels 14 and 16, and at the rear by left and right caster wheels 18 and 19. Each wheel mounted on an axle which is journaled into a supporting frame assembly 40. Each rear caster wheel is mounted into its respective frame assembly 40 by a vertical shaft journaled into frame assembly 40 as shown in FIG. 3. Each rear caster wheel may be locked into a transverse position by locking pin assembly 19 when desired as described below. Each frame assembly 40 includes an upright member 42 slidably received within a complementary vertical sleeve 44 of a mounting assembly 46. Frame assembly 40 may thereby be raised or lowered relative to the ground on upright member 42 by actuation of hydraulic cylinder 43, allowing the ground clearance of composter 10 to be raised or lowered during operation as more fully described below. Mounting bracket 46 is in turn pivotably mounted on frame 12 at brackets 48, allowing each frame assembly 40 and wheel to be pivoted by actuation of hydraulic cylinder 45 for different modes of operation as described below. An alternative design for the wheel frame assemblies 40 is shown in FIGS. 4A and 4B. Note that in the alternative frame assembly design for drive wheels 14 and 16, frame assembly 40 does not pivot, but rather is moved rearward by hydraulic cylinder 45 and raised up by hydraulic cylinder 43 to its stowed position.

Figure 5:
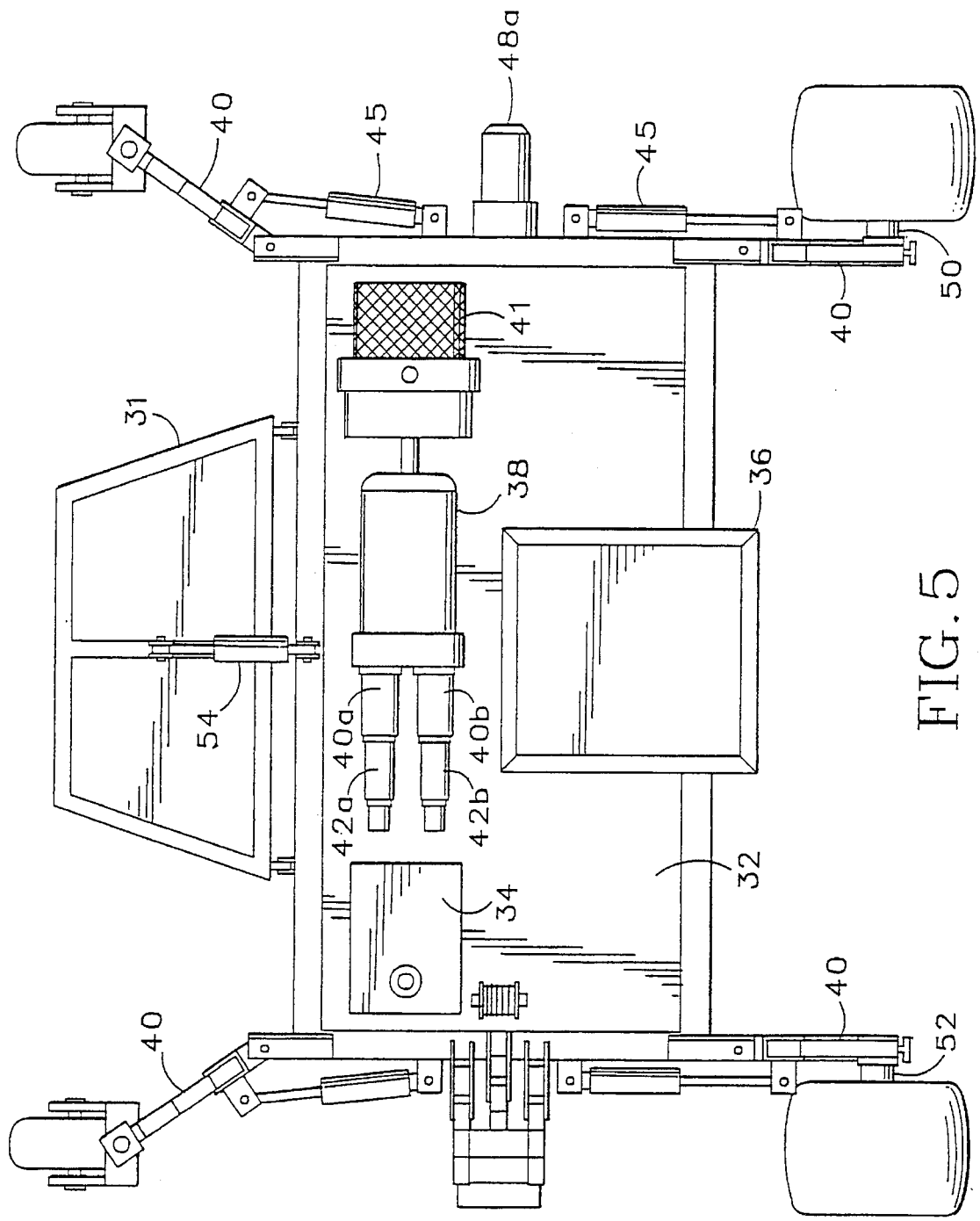
FIG. 5 is a top view of a composting apparatus according to the present invention configured for treating composting material.

As best seen by reference to FIG. 5, frame 12 includes upper deck 32 on which are mounted fuel tank 34, operator's cab 36, hydraulic oil tank 37, engine 38, and hydraulic pumps 40, 42 and 44. As readily appreciated by those skilled in the art, suitable auxiliary equipment for operation of the engine and drive components in dusty environments is also provided, such as rotating self-cleaning screen 41 of the cooling system of engine 38. Power for the operation of composter 10 is provided by hydraulic pumps 40, 42 and 44, which are driven by engine 38, preferably a 402 hp diesel engine such as Model 3406, manufactured by Caterpillar. Each hydraulic pump 40a and 40b delivers pressurized hydraulic fluid to each of drum assembly drive motors 48a and 48b to reversibly drive rotating drum and paddle assembly 22 from each end. Hydraulic pumps 42a and 42b deliver pressurized hydraulic fluid to left and right drive motors 50 and 52 respectively. Pump 44a delivers pressurized fluid to hydraulic cylinders 43 for raising and lowering frame 12, while pump 44b provides pressurized fluid for operating hydraulic cylinders 45, and hydraulic cylinder 54 for raising and lowering tail section 31. Left and right drive motors 50 and 52 are separately controllable by the operator for steering and for driving left and right drive wheels 14 and 16 respectively through an appropriate drive assembly of a suitable design as could be readily determined by one skilled in the art.

In the preferred embodiment, a planetary gear assembly, Model No. W-2 as manufactured by Fairfield is used on each the left side and right side drive wheel and motor assembly. The left side planetary drive assembly differs from that of the right side only in that it is rendered free wheeling for reasons described below by operation of an external T-handle. Composter 10 is steerable and drivable forwardly, rearwardly, and sideways as described below by virtue of the fact that each drive wheel is drivable forwardly and rearwardly independently of the other by appropriate hydraulic controls of standard design and well-known to those skilled in the art.

Figure 5A:
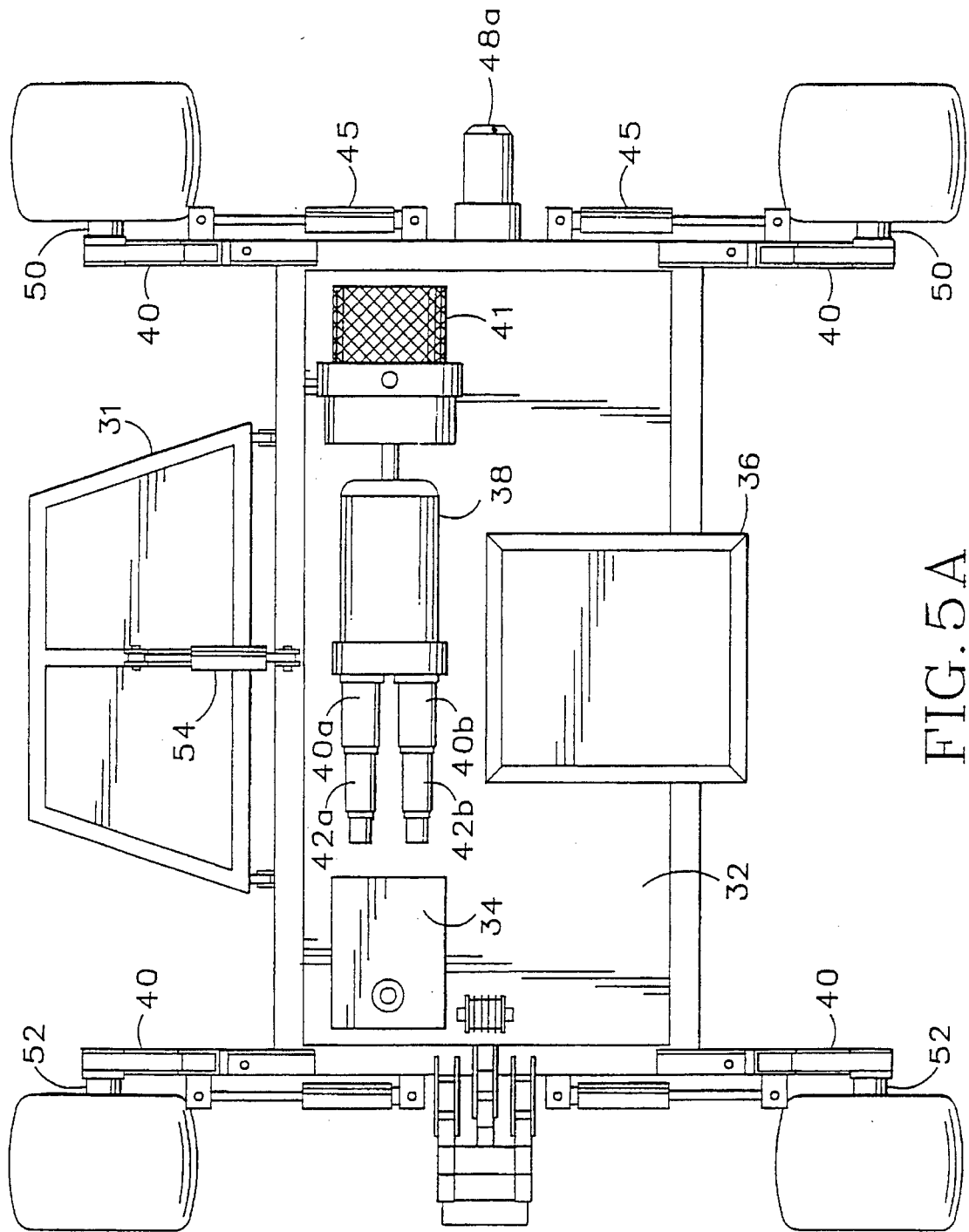
FIG. 5A is a top view of an alternative embodiment of a composting apparatus according to the present invention.

In an alternative four-wheel drive embodiment (FIG. 5A), left and right castor wheels 18 and 20 are replaced by left and right rear drive wheels 15a and 15b and respective hydraulic drive motors 51 and 53. Corresponding controls as described above with reference to the two-wheel drive embodiment are provided to allow the operator to control the speed and direction of each of the four driven wheels.

While the present invention is not intended to be defined or limited by reference to any specific dimensions, in both prior art composters and the present invention there is an efficiency of operation resulting from incorporation of a relatively long drum assembly, 17 feet or more for example. Accordingly, the overall width of the composter will be even greater than the drum length, while the overall length of the frame of the composter is preferably no greater than 8'6". While providing more efficient operation by requiring fewer passes to process a given amount of composting material, the overall width of prior art composters prevents them from being driven through standard fence gates between adjacent fields, and requires that they be transported over public roads by truck and trailers designed for transporting heavy equipment. The present invention overcomes these limitations and cost disadvantages of prior art composters by providing for the first time a composter which may be driven sideways under its own power through standard fence gates or over public roads for short distances, and which may be towed for longer distances over public roads when necessary. The means of configuring the present invention for so doing will now be described by reference to FIG. 5 where it can be seen that each wheel is mounted on a frame assembly 40 which is movable between a first position for accommodating forward and rearward travel of composter 10 during normal operation, and a second transverse position for accommodating towing or sideways travel of the composter. Each frame assembly 40 is moved between the first and second positions by a dedicated hydraulic cylinder 45, which is controlled by means of appropriate controls (not shown) from operator's cab 36.

Figure 3A:
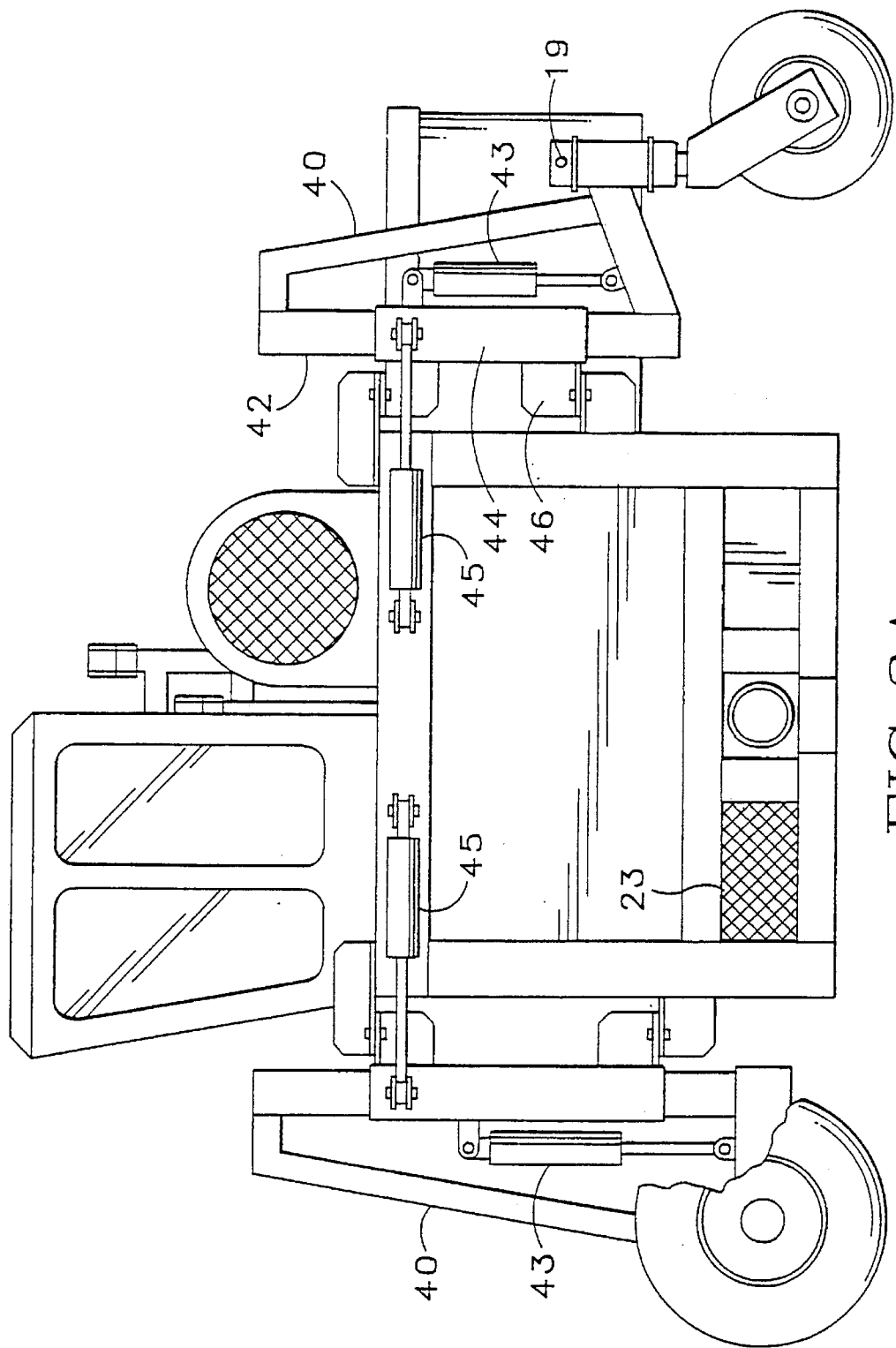
FIG. 3A is a left side view of another embodiment of the composting apparatus according to the present invention.

Referring now to FIGS. 1 through 14, drum assembly 22 is mounted transversely within chamber 24. Chamber 24 is an open-ended housing consisting of a top wall 26, left and right side walls 28 and 30, and tail section 31 (FIG. 5). Front opening 25 is partially shrouded as shown in FIG. 1 by front drapes 33a–c. In the preferred embodiment, screened openings 23 are provided in left and right side walls 28 and 30 ahead of drum 56 to permit additional air to be drawn into chamber 24 during operation. (FIG. 3A). Tail section 31, essentially a rearwardly extending projection of chamber 24, extends rearwardly from rear opening 27. Tail section 31 may be described as a generally planar frame having rearwardly and inwardly extending side members pivotally attached to frame 12 at one end, and to lateral member at their outer ends. Drapes 39 are hung from each side member and the lateral member as best seen in FIG. 2. The drapes may be made from any suitable material. In the present embodiment, they are fabricated from grade 2 SBR in the form of ½" thick conveyor belt material. Tail section 31 is pivotable by hydraulic cylinder 54 between a lowered operational position and a raised stowed position for use during transport of the composter. Rear drapes 35 are hung from each side and the rear of tail section 31 and from angled frame members defining rear opening 27 as shown. Chamber 24 serves to contain direct the air streams and composting material during operation of composter 10, and to reform the composting material into a windrow after mixing and aerating as more fully described below.

Drum assembly 22 is journaled at opposite ends in left and right subframes 12a and 12b. Hydraulic motors 48a and 48b are mounted on left and right subframes 12a and 12b, and reversibly drive drum assembly 22 by means of shafts 49a and 49b when supplied with pressurized hydraulic fluid from hydraulic pumps 40a and 40b as described above. Drum assembly 22 includes drum 56, a hollow cylinder having closed ends, onto which are welded shafts 57a and 57b (not shown). Shafts 57a and 57b are journaled into frame 12, and drivably connected with drum assembly drive motors 48 as described above. Each of shafts 57a and 57b are journaled into its respective subframe by means of a four bolt flange-type tapered roller bearing 91 such as Model FB 900 manufactured by Browning Company. Each bearing 91 is fitted into a corresponding hole in left and right subframes 12a and 12b. A split ring collar 92 is fitted into circumferential recesses 96 on each of shafts 57a and 57b, and bears against the protruding rotating race 94 of the tapered roller bearing to counteract spreading forces exerted on subframes 12 a and 12b. Drum 56 thereby functions as a tension member in frame 12 counteracting spreading forces represented in FIG. 7A by force arrows 102a and 102b. This novel use of drum 56 as a tension member saves the weight of additional structural members which would otherwise be required to counteract spreading forces on subframes 12a and 12b , and allows a lower overall height which further accommodates towing the composting apparatus on public highways.

Turning now to FIGS. 8–12, a plurality of left and right paddles 58 and 60 respectively, and center paddles 62 are mounted on the outer cylindrical surface of drum 56 as shown. In one embodiment, the paddles are arranged in four evenly spaced helical rows along the length of the drum, each row traversing 90° about the drum from one end to the other. In a second embodiment shown in FIG. 9A, the paddles are arranged in four "V-shaped" rows. The V-shaped rows of paddles serve to eliminate transverse steering torque on the composter which may be experienced with the use of helical rows where one end of the paddle row engages the composting material prior to the other. The V-shaped rows are oriented so that the paddles at each end of a row engage the compost material simultaneously, eliminating any steering effect resulting from paddles on one end of the drum engaging the compost material before the other. Additionally, the paddles of each V-shaped row are offset from those of adjacent rows to minimize bypassing of compost material past the drum. In one embodiment, the paddles in each row are spaced at 12" intervals. The corresponding paddles of adjacent rows are offset 3" from one another. Offsetting of the paddles in this manner promotes complete mixing and aeration since the compost material at every point along the entire length of drum 56 is directly in the path of at least one paddle.

It should be readily understood that more or less rows of paddles and different arrangements of paddles may be used. It is preferred however that left and right paddles 58 and 60 are mounted generally to the left and right of the center point of the drum respectively, while center paddles 62 are mounted along a central portion of the drum. Center paddles 62 may also be interspersed with the left and right paddles along transition portions of the drum as shown in FIG. 9. Minor variations in the number and arrangement of center paddles interspersed with left and right paddles are possible in accordance to the present invention.

Figure 14:
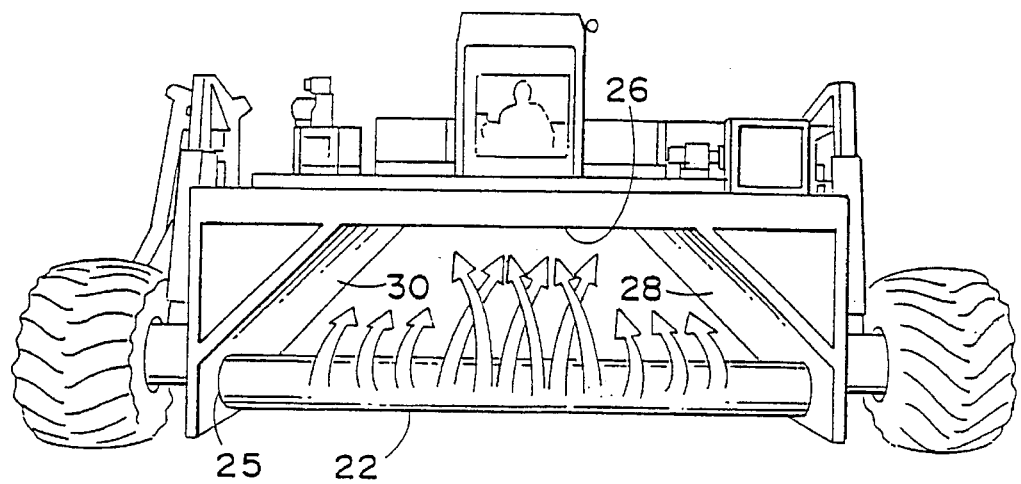
FIG. 14 is a front perspective view of a composter according to the present invention, having the drapes removed to expose the chamber and drum assembly.
Figure 15:
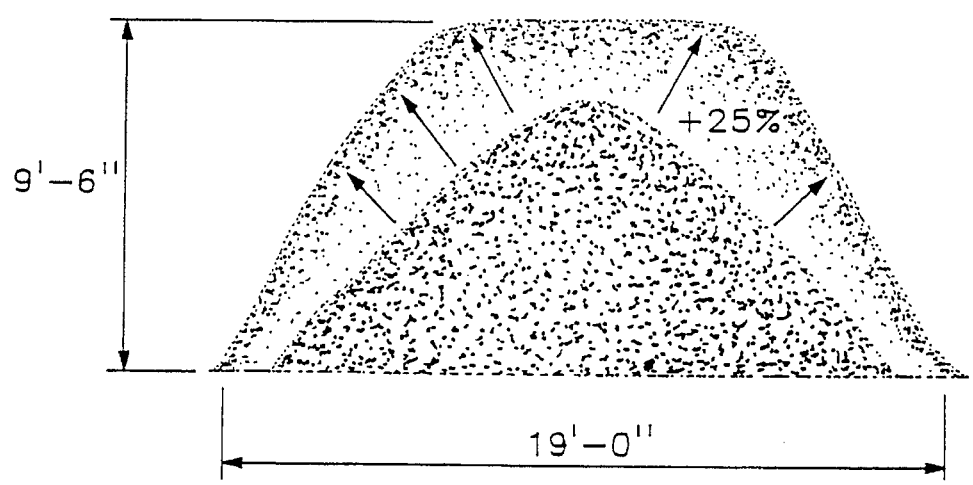
FIG. 15 shows the increased volume of a representative windrow formed by a composting apparatus according to the present invention.

Each paddle has a base section 64 by which it is pivotally attached to bracket 66, which in turn is welded to drum 56 as shown in detail in FIG. 14. Each paddle is additionally secured in position by a shear pin 68 inserted into hole 70. Shear pin 68 serves to release the paddle to pivot rearwardly if impacted by a solid object during rotation of drum assembly 22. A deflector plate 71 is attached at a rearward angle to a forward edge of bracket 66. Each paddle includes a cutting edge 72 formed on the leading edge of paddle body 74. Extending transversely from the trailing edge of left and right paddles 58 and 60 is a single paddle portion 76 extending inwardly toward the longitudinal center of drum 56. Center paddles 62 each have a pair of opposed paddle portions 78 extending outwardly toward opposite ends of drum 56. The paddle portions are preferably disposed at an angle slightly less than perpendicular relative to the paddle body.

Each paddle portion 76 serves to generate an air stream directed upwardly of the drum and in the direction of the free end of the paddle when the drum is rotated in a direction such that the paddle travels upwardly and then rearwardly in its circular path around the drum. Stated slightly differently, the normal direction of rotation of the drum assembly is in the opposite direction of wheel rotation when the composter is being driven forward.

Having described the construction of the preferred embodiment, its operation will now be explained. The primary function of composter 10 is to shred, mix and aerate solid composting material. While a wide range of materials can be accommodated, the preferred embodiment is particularly suited to the composting of relatively light agricultural wastes such as straw and grass.

Figure 4:
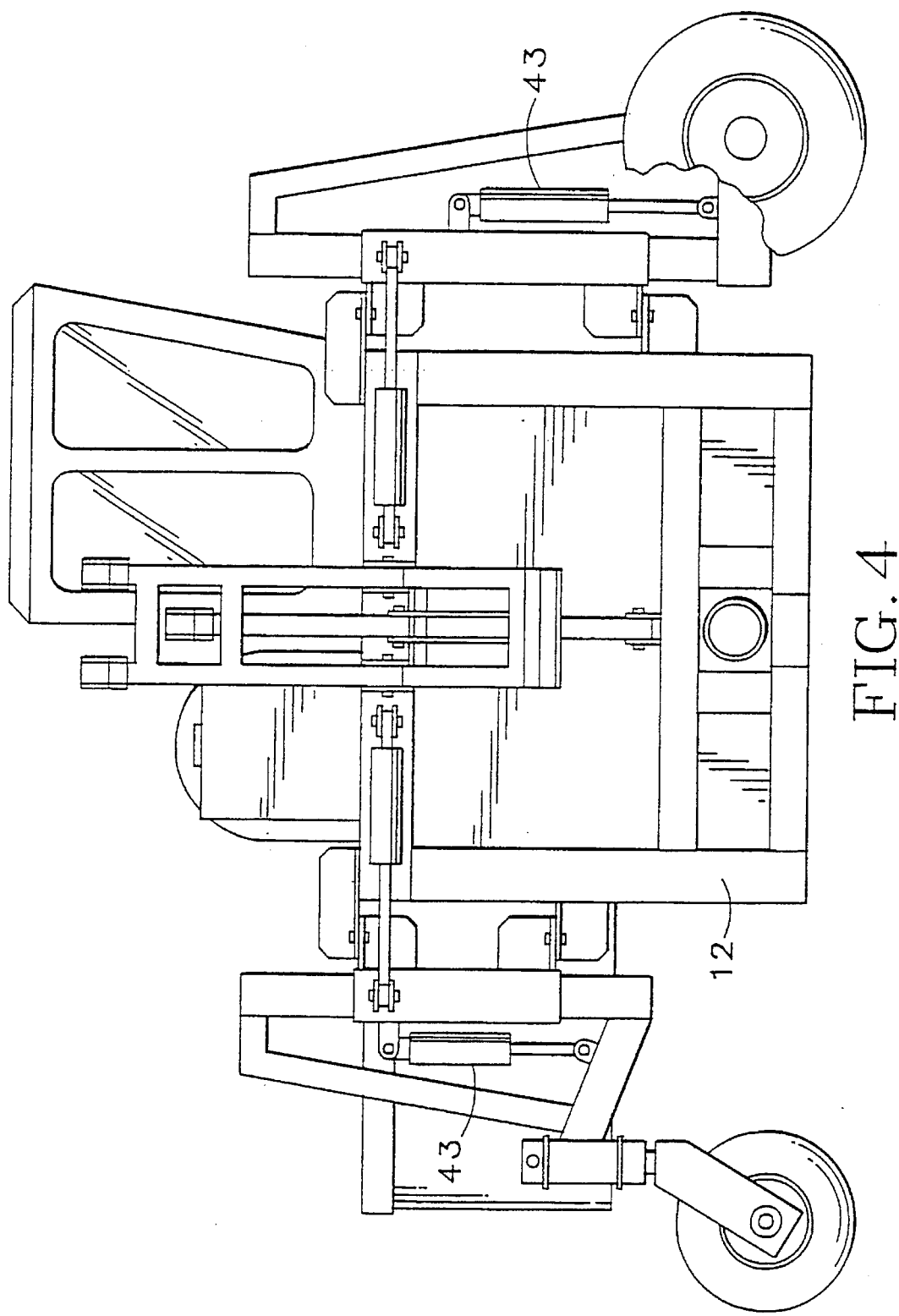
FIG. 4 is a right side view of the composting apparatus according to the present invention as shown in FIGS. 1 and 2.
Figure 4A:
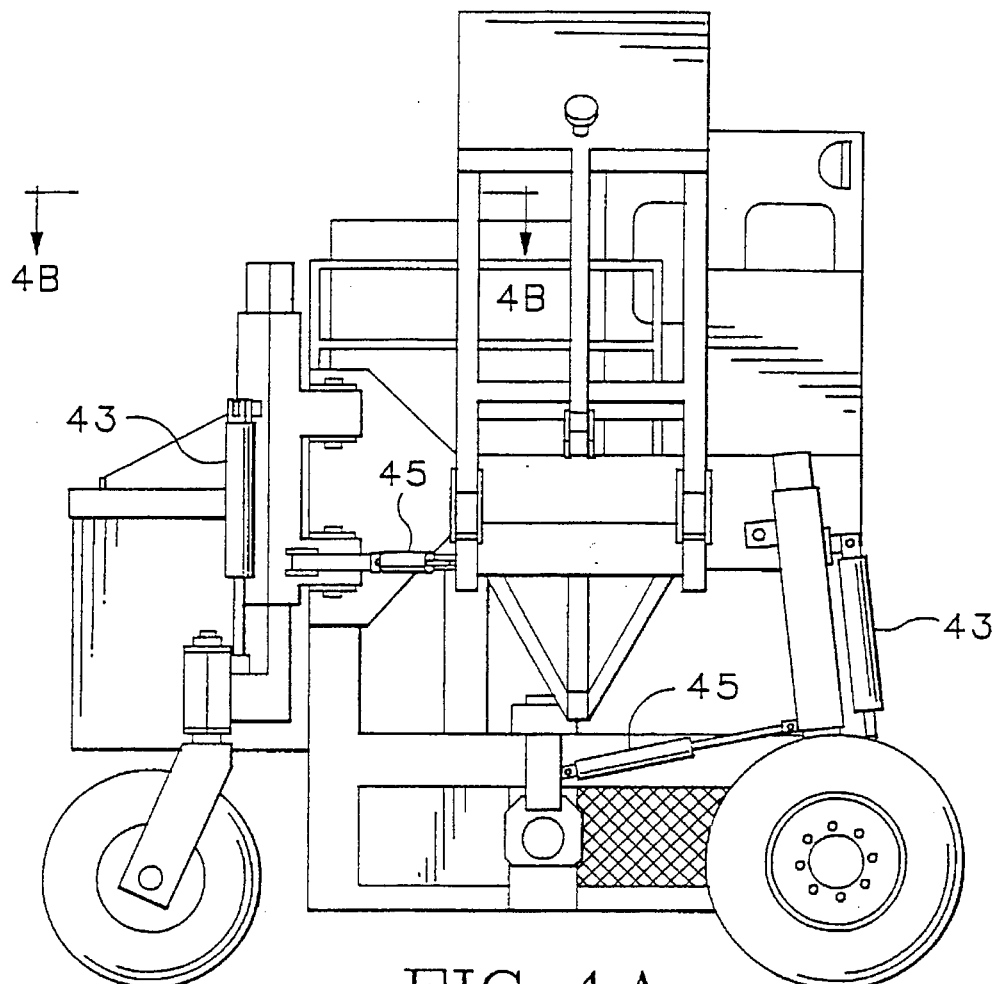
FIG. 4A is a right side view of the composting apparatus according to the present invention as shown in FIGS. 1A and 2A.
Figure 4B:
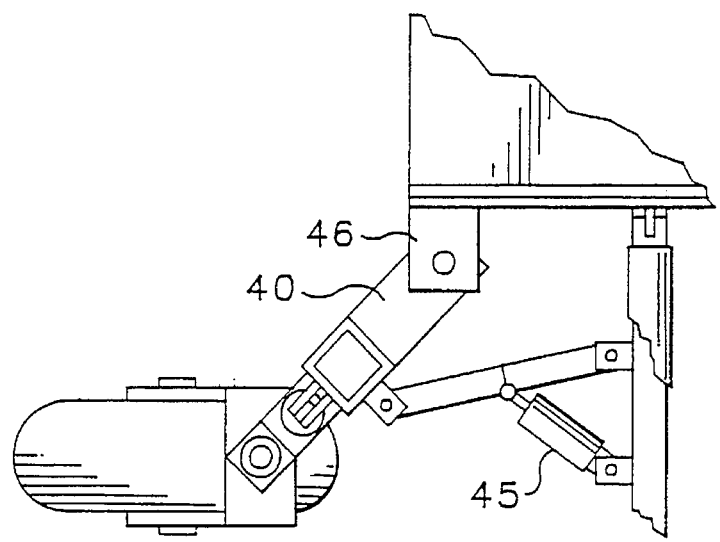
FIG. 4B is an enlarged view of the pivoting rear wheel assembly in its extended position.
Figure 6:
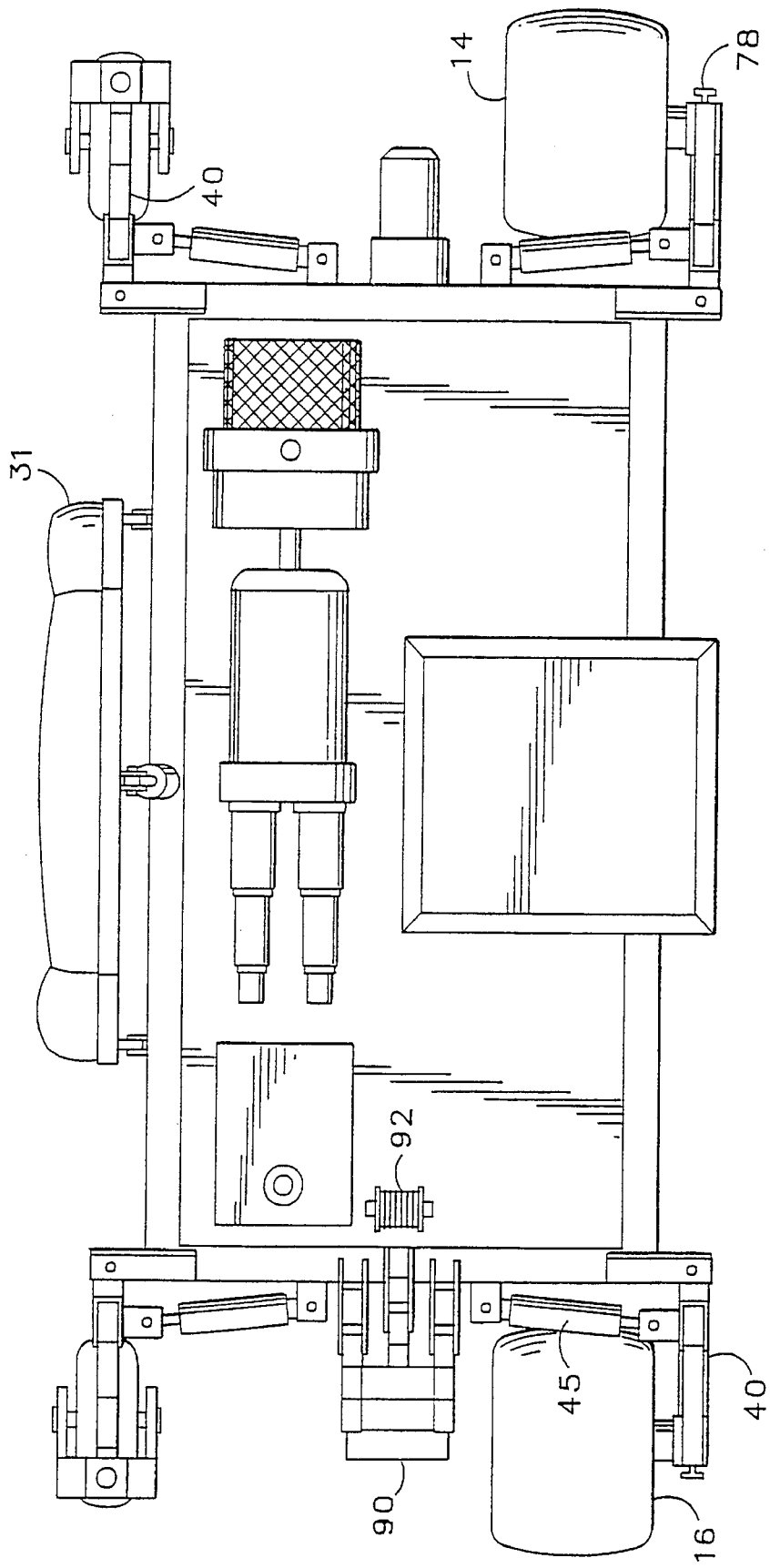
FIG. 6 is a top view of a composting apparatus according to the present invention configured for being transported by towing.

Referring now to FIGS. 4 and 6, to configure the composter for being driven sideways, each hydraulic cylinder 43 is activated to lower frame 12 onto the ground and to raise each wheel several inches above the ground. Tail section 31 is retracted to its raised stowed position by hydraulic cylinder 54. Each frame assembly 40 is pivoted to its transverse position as shown in FIG. 6; left and right drive wheels 14 and 16 are thereby aligned transversely, as are left and right rear caster wheels. Left drive wheel 14 is then drivably disengaged from left drive motor 50 by pushing T-handle 78 inward to disengage the planetary gear drive as discussed above. Each hydraulic cylinder 43 is then activated to lower each wheel and raise frame 12 above the ground. Composter 10 is now configured for being driven sideways. It is propelled in this configuration by right drive wheel 16, now facing in the direction of "forward travel", which by virtue of being fitted with flexible hydraulic supply and return lines is operable in the transverse position. Steering is accomplished by operation of hydraulic cylinder 45 to "swing" right drive wheel 16 slightly as required to adjust the direction of travel. After arriving at the desired location, the composter is reconfigured to its composting mode by reversing the foregoing procedure.

Figure 7:
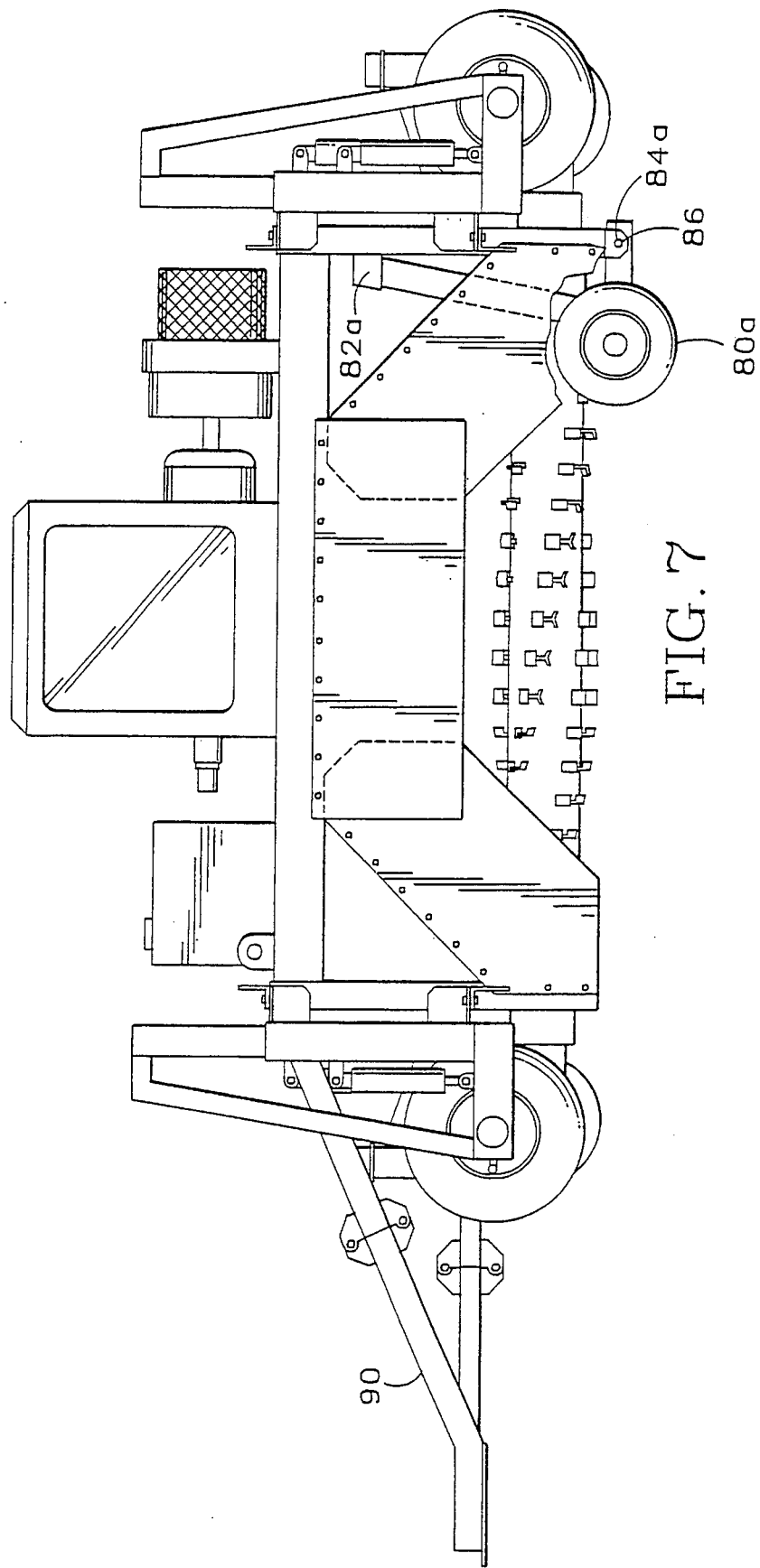
FIG. 7 is a front view of a composting apparatus shown in FIGS. 1 and 2 configured for being transported by towing.
Figure 9A:
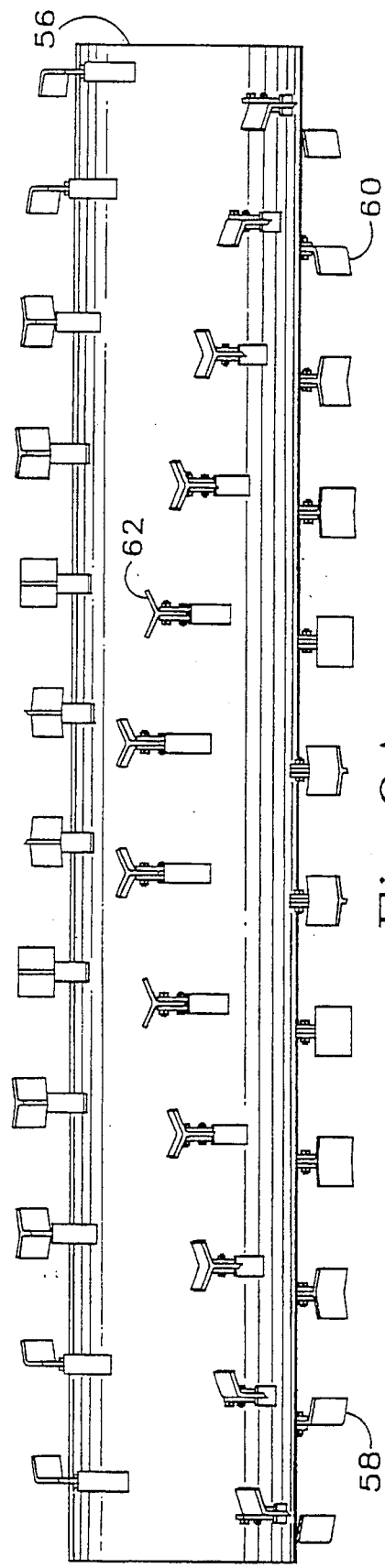
FIG. 9A is bottom view of an alternate drum and paddle assembly.

If it is necessary to transport the composter a greater distance, other transporting configurations are provided which allow the composter to be flat-towed by a truck. Referring to FIGS. 3 and 4, each wheel is raised above the ground, pivoted to its transverse position, and the wheels lowered, raising frame 12 above the ground. Left drive wheel 14 is drivably disengaged as before, and left rear castor is locked against castoring action by pin assembly 19. As best seen in FIG.7, a pair of auxiliary towing wheel assemblies 80a and 80b are then mounted on the right side of frame 12 by being inserted into channels 82a and 82b, and yokes 84a and 84b respectively, and secured therein by locking pins 86. Auxiliary towing wheel assemblies 80a and 80b are additionally secured by lateral link 86 which is pinned into bracket 88 and frame 12 as shown. Right side drive wheel 16 and right rear castor 20 are then raised to lower the right side of frame 12 onto towing wheel assemblies 80a and 80b. As shown in FIG. 2, fifth-wheel assembly 90 is an articulated, hinged frame assembly which is normally stored in a retracted position, and which is extended and locked into position as shown in FIG. 7 for being hooked to a truck (not shown) for towing composter 10. Fifth-wheel assembly 90 may be raised and lowered by any suitable winch assembly 92 (FIG. 6). An alternative fifth-wheel design is shown in FIG. 7A where rather than a separate towing wheel assemblies, an integral rear towing wheel assembly 81 is provided which can be raised into and lowered from its retracted position (FIG. 7A) by operation of hydraulic cylinder 83 without being detached from frame 12. Composter 10 thus configured may be conveniently towed over public roads with considerably less expenditure of time, effort and expense when compared to prior art composters. Towing the composter is further accommodated by the novel frame design of the present invention as shown in the figures. Drum 56 serves as a tension member interconnecting vertical subframes 12a and 12b as discussed above. The use of drum 56 as a tension member in frame 12 eliminates the need for additional structural members to resist spreading forces exerted on subframes 12a and 12b during operation and towing. Frame 12 can therefore be designed with a lower overall height to accommodate passage beneath lower bridges and overpasses. Upon arriving at its destination, towing wheel assemblies 80a and 80b are removed and composter is reconfigured for operation by reversing the above procedure. In the alternative embodiment, wheel assembly 81 is retracted by operation of hydraulic cylinder 83.

While suitable for use with various composting materials, the preferred embodiment of the present invention is of particular value in the treatment of relatively light composting materials such as straw or grass wastes. Prior art composters have proven generally unsatisfactory for processing such wastes due to their inability to effect adequate aeration of the materials to ensure aerobic conditions throughout the material, and due to their inability to effect adequate removal of excess moisture from the material when required. Applicants have discovered a solution to these problems in the form of the present invention wherein a novel drum and paddle assembly 22 is rotated at high speed in a direction opposite to that of prior art composters. In addition to directly impacting the composting material for shredding it, the rotating drum assembly 22 also draws air from ahead of the composter into chamber 24 and generates a high-speed stream of air in chamber 24. The high speed air stream entrains the relatively light materials and circulates them in overlapping, counter-rotating circular patterns within chamber 24 for thoroughly aerating and mixing them. The entrained materials are suspended and circulated in the air streams, and then redeposited in a windrow to the rear of the rotating drum. As a further advantage, after mixing and aerating the composting materials as described, the present invention redeposits the materials in a relatively tall, more squared-off windrow having a higher volume of materials per unit of surface area than known composters.

To begin a composting operation, engine 38 is started, and drum drive motors 48a and 48b are engaged to counter-rotate drum assembly 22, preferably at approximately 550 RPMs. Composter 10 is now raised or lowered to a desired ground clearance by activation of hydraulic cylinders 43. By so doing, composter 10 can be adjusted to process more or less material. This unique ability of the present invention allows for a more efficient composting operation by permitting greater volumes of material to be formed into a single windrow and processed in a single pass, resulting in more efficient use of the available ground area, and less processing time for a given amount of material. The height adjusting ability is additionally useful in that as the composting process partially decomposes the windrow of material, the volume of material decreases. The present invention allows the operator to readily adjust for the volume decrease without any decrease in the effectiveness of mixing and aeration.

Having selected the appropriate height, the operator now drives composter 10 forward to engage the composting material. As the composter engages and proceeds along the windrow, the composting material is mixed and aerated by the action of the counter-rotating drum assembly. We define counter-rotation to mean rotation in a counterclockwise direction when viewed from the right end of the drum assembly, or stated slightly differently, in the opposite direction of rotation of forward rolling drive wheels 14 and 16. Counter-rotating drum assembly draws air into chamber 24 from ahead of the composter in the form of an upwardly and rearwardly directed air stream ahead of the drum assembly, providing significant advantages as will be further explained. As composter 10 approaches, the upwardly flowing air stream first engages the windrow ahead of the drum assembly and entrains a portion of the material which travels in the air stream and which does not directly engage the counter-rotating drum assembly. Counter-rotating drum assembly 22 then engages the remaining material which is deflected by deflector plate 71 toward cutting edge 72, where the material is shredded, and then entrained in the air stream. While the precise amounts of material shredded in each pass of the composter are not known with certainty, in the processing of grass straw, for example, 3–4 passes through the composting material will normally produce a thoroughly shredded composting material.

Under certain operating conditions, particularly when processing heavier materials, drum 30 can be slowed and even stalled. Owing to the hydraulic coupling between the drum and engine, stalling of the drum can stall the engine as well. In the preferred embodiment, this problem is addressed by monitoring the engine speed to detect slowing of the drum, and reducing power to the drive wheels when slowing of the drum is detected. Reducing power to the drive wheels slows the forward progress of the composter through the windrow, thereby reducing the load on the drum and allowing it to resume its normal operating speed. In the preferred embodiment, the power to the drive wheels is first reduced by to 50% or normal, and if after no more than a few seconds the drum has not resumed its normal operating speed, further reducing power to the drive wheels to 30% of normal. Once the drum has resumed normal operating speed, the power to the drive wheels is increased to its normal level. In order to avoid lurching and resultant damage to the drive mechanism, applicants have found that the power to the drive wheels must be resumed gradually rather than all at once.

Figure 16:
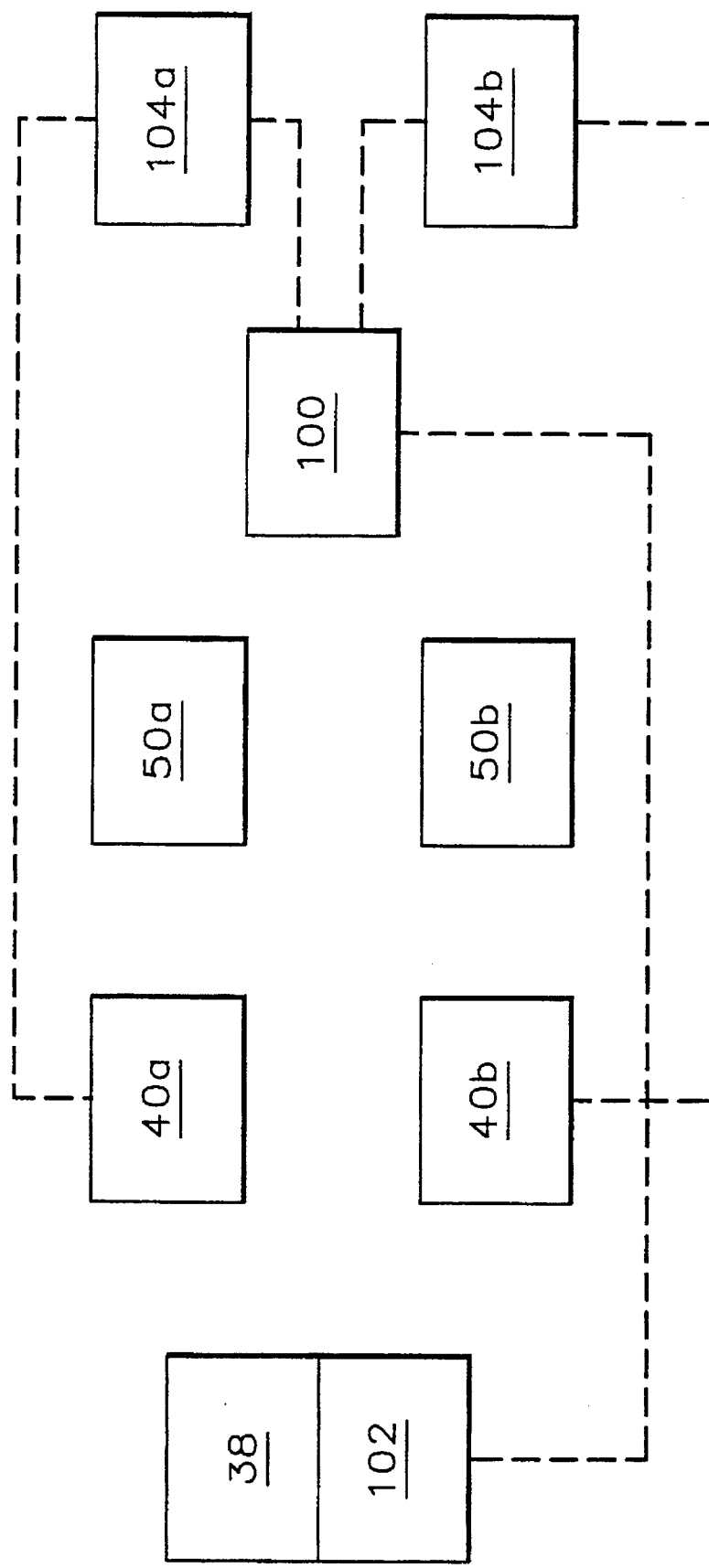
FIG. 16 is a schematic diagram of the control circuit for slowing the speed of the composter when the drum speed is reduced.

Reducing and increasing the power to the drive wheels in response to changes in the drum speed is achieved by means of electrical control of the hydraulic pumps which provide pressurized hydraulic fluid to the left and right drive wheel hydraulic motors 42a and 42b respectively. A schematic diagram of the control system is shown in FIG. 16. A manually operated speed controller is provided for each of the two drive wheels. During normal operation, speed controllers 104a and 104b electrically control the output of hydraulic pumps 40a and 40b responsive to movement of the speed controllers by the operator. When drum 30 (not shown in FIG. 16) slows, a corresponding slowing of alternator 102 triggers a signal to controller 100, a Sundstrand Model MCH22BL1844. In response, controller 100 reduces the voltage applied to speed controllers 104a and 104b by 50%, which reduces the power to left and right drive wheel hydraulic motors 50a and 50b respectively by a corresponding amount. If within two seconds drum 30 has not resumed its normal operating speed, controller 100 further reduces the voltage to speed controllers 104a and 104b to 30% of normal. In applicants' experience reduction of power to the drive wheels to 30% of normal has been sufficient to overcome all but the most severe stalling conditions.

Once drum 30 has resumed its normal operating speed, controller 100 restores normal voltage to speed controllers 104a and 104b and normal operation is resumed. Applicants have found that the control system as described is so responsive that it is necessary to resume normal power to the drive wheels gradually in order to avoid lurching of the composter and damage to the drive train. To that end, once the drum has resumed normal operating speed controller 100 increases the voltage to speed controllers 104a and 104b gradually over several seconds.

The entrained composting material is propelled upwardly and rearwardly in a pair of generally rotating vortex-like airstreams. The end paddles generate air currents directed upwardly of the drum and transversely toward the center portion of the drum, while the center paddles generate an air current directed upwardly and rearwardly of, and transversely toward the ends of the drum when the drum is rotated. The air currents generated by the end and center paddles intersect and combine to form the vortex-like, compost entraining air stream for mixing and aerating the windrow of composting material.

The airstreams overlap at their inner portions, providing repeated exchange of entrained material therebetween. As the air streams begin to lose their velocity, the composting material begins to drop out of the air stream and is redeposited into a windrow. Applicants have discovered for the first time that this method of composting relatively light composting materials such as straw and grass wastes solves the aforementioned shortcomings of prior art composters; namely, that is that the relatively light wastes of this nature can be sufficiently aerated, mixed and dried as necessary by being entrained in and contacted with a relatively large volume air drawn into a mixing chamber by a drum and paddle design according to the present invention.

The airstreams are generated according to the preferred embodiment by the left, right and center paddles previously described. As best seen in FIG. 9 and 14, each row of paddles according to the present invention includes a group of paddles having paddle portions 76 facing toward opposite ends of the drum. As the drum is rotated, each paddle portion 76 draws air into chamber 24 and generates a series of airstreams flowing in the direction of the drum rotation and laterally outwardly toward the end of the drum. The series of airstreams generated by the two group of similarly oriented paddle portions 76 combine to form oppositely rotating airstreams spiralling rearwardly within chamber 24 and intersect. The interspersing of paddles having opposite facing paddle portions 76 near the center of the drum creates a region in which the oppositely rotating airstreams overlap. In the overlapping region, composting material is continuously exchanged between the airstreams, providing more thorough mixing of the composting materials than has heretofore been possible. The relatively light materials remain entrained in the airstreams for a relatively long time, until the air stream slows sufficiently to cause the material to fall from the airstream. In this way, the composting material is afforded an extended contact time for aeration and drying. As the airstreams spiral rearward, they exit chamber 24 through rear opening 27 and rear tail portion 31. Rear drapes 35 serve to limit the rearward travel of the airstreams and any entrained or thrown composting materials. Applicants have discovered that the mixing and aerating effectiveness of the present invention is significantly enhanced by the use of tail section 31, which apparently serves to promote the formation and rearward extension of the rotating airstreams, extending the contact time between the air and composting materials. The ability of the present invention to provide extended, interstitial aeration of relatively light composting materials has not been possible with prior art composters, and represents a significant advance in the art.

A further benefit of the present invention over prior art composters is related to the large volume of fresh air which is continually drawn into chamber 24 and into intimate contact with the composting material. This feature is also of significant benefit when composting heavier materials which may not be readily entrained in the airstream, and which are mixed primarily by being thrown upwardly and rearwardly due to contact with paddle portions 76. Even so, with the large amount of air drawn into chamber 24 in the form of high-speed air streams, these heavier materials are contacted with significantly more air under more effective aerating conditions than is possible with known composters.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A drum and paddle assembly for mixing and aerating a windrow of composting material comprising:
    a. an elongate drum having a longitudinal axis, first and second end portions, and a center portion, the drum being rotatable about its longitudinal axis at a predetermined rotational speed; and
    b. means extending outwardly from the drum for generating a compost entraining air stream when the drum is rotated at the predetermined speed, the compost entraining air stream having a sufficient velocity for entraining substantially all of the composting material therein for mixing and aerating the windrow of composting material when the rotating drum is engaged therewith.

2. A drum and paddle assembly according to claim 1 wherein the compost entraining air stream comprises a plurality of air currents, and wherein the air current generating means comprises a plurality of paddles extending outwardly from the cylindrical outer surface of the drum, each said paddle comprising a base portion connected to the drum, and a blade portion, each said blade portion having a major surface oriented for generating at least one said air current having a sufficient velocity for entraining and transporting composting material upwardly of the rotating drum when the drum is rotated at the predetermined rotational velocity.

3. A drum and paddle assembly according to claim 1 wherein the compost entraining air stream comprises a plurality of intersecting air currents, each said intersecting air current having a sufficient velocity for entraining and transporting a portion of the windrow of composting material upwardly of the drum, and transversely relative to the drum when the drum is rotated at the predetermined rotational velocity.

4. A drum and paddle assembly according to claim 3 wherein the means for generating a plurality of intersecting air currents comprises:
    a plurality of end paddles extending radially outwardly from the first and second end portions of the drum, each said end paddle comprising a base portion connected to the drum and a blade portion, the blade portion having a major surface oriented relative to the drum for generating an air current directed upwardly of the drum and transversely toward the center portion of the drum when the drum is rotated at the predetermined rotational speed;
    a plurality of center paddles extending radially outwardly from the center portion of the cylindrical outer surface, each said center paddle comprising a base portion connected to the drum, and a blade portion having first and second major surfaces, said first and second major surfaces oriented relative to the drum for generating an air current directed upwardly and rearwardly of, and transversely toward the first and second end portions of the drum respectively when the drum is rotated at the predetermined rotational speed; and
    the air currents generated by said end and center paddles intersecting and combining to form the compost entraining air stream for mixing and aerating the windrow of composting material when the rotating drum is engaged therewith.

5. A drum and paddle assembly according to claim 4 wherein said compost entraining air stream comprises a vortex-type air stream which transports the entrained composting material in a generally circular path.

6. A drum and paddle assembly according to claim 4 wherein said end and center paddles extending radially outwardly from said drum are arranged in a plurality of helical longitudinal rows.

7. A drum and paddle assembly according to claim 4 wherein said drum further comprises first and second transition portions disposed be%ween the center portion and the first and second end portions respectively, the first and second transition portions of the drums having a plurality of end paddles and a plurality of center paddles extending radially outwardly therefrom.

8. A drum and paddle assembly according to claim 1 which further comprises means for comminuting said composting material.

9. A drum and paddle assembly according to claim 8 wherein said means for comminuting said compost material includes a blade extending radially outwardly from said drum for engaging and cutting said composting material when said drum is rotated.

10. A compost aerating apparatus for mixing and aerating a windrow of composting material comprising:
    a. a frame having a front, a rear, and first and second opposing sides;
    b. driving means connected to the frame for propelling the apparatus along the windrow;
    c. a pair of rear wheels rotatably connected to the frame;
    d. an elongate cylindrical drum journaled transversely in the frame, the drum having a longitudinal axis, first and second end portions and a center portion;
    e. means drivably connected to the drum for rotating the drum at a predetermined rotational speed; and
    f. the drum including means for generating a compost entraining air stream when the drum is rotated at the predetermined speed, the compost entraining air stream having a sufficient velocity for entraining substantially all of said composting material therein for mixing and aerating the windrow of composting material.

11. A compost aerating apparatus according to claim 10 wherein the compost entraining air stream comprises a plurality of air currents, and wherein the means for generating said entraining air stream comprises a plurality of paddles extending radially from the cylindrical outer surface, each said paddle comprising a base portion connected to the drum and a blade portion, each said blade portion having a major surface oriented for generating an air current having a sufficient velocity for entraining and transporting a portion of the windrow of composting material upwardly of the drum when the drum is rotated at the predetermined rotational velocity.

12. A compost aerating apparatus according to claim 11 wherein the means for generating the plurality of intersecting air currents comprises:

a plurality of end paddles extending radially outwardly from the first and second end portions of the cylindrical outer surface of the drum, each said end paddle comprising a base portion connected to the drum and a blade portion, the blade portion having a major surface oriented relative to the rotational direction of the drum for generating an air current flowing upwardly of the drum and transversely toward the center portion of the drum;

a plurality of center paddles extending radially outwardly from the center portion of the drum, each center paddle comprising a base portion connected to the drum and a blade portion having first and second major surfaces, said first and second major surfaces oriented relative to the drum for generating an air current flowing upwardly of the drum, and transversely outwardly toward the first and second end portions of the drum respectively; and the upwardly and transversely flowing air currents generated by the end paddles and the center paddles intersecting and combining to form the compost entraining air stream for mixing and aerating the composting material.

13. A compost aerating apparatus according to claim 12 wherein said compost entraining air stream comprises a vortex-type air stream which transports the entrained composting material in a generally curved path.

14. A compost aerating apparatus according to claim 13 wherein said end and center paddles extending radially outwardly from the drum are arranged in 4 helical longitudinal rows on the drum, each helical longitudinal row traversing 90° circumferentially around the outer surface of the drum.

15. A compost aerating apparatus according to claim 13 wherein said drum further comprises first and second transition portions disposed between the center portion and the first and second end portions respectively, the first and second transition portions of the drums having a plurality of end paddles and a plurality of center paddles extending radially outwardly therefrom.

16. A compost aerating apparatus according to claim 12 wherein said end and center paddles extending radially outwardly from said drum are arranged in a plurality of helical longitudinal rows on the drum.

17. A compost aerating apparatus according to claim 12 wherein said paddles extending radially outwardly from said drum are arranged in a plurality of V-shaped longitudinal rows.

18. A compost aerating apparatus according to claim 10 wherein the compost entraining air stream comprises a plurality of intersecting air currents, each said intersecting air current having a sufficient velocity for entraining and transporting a portion of the windrow of composting material upwardly of the drum, and transversely relative to the drum for mixing and aerating the windrow of composting material.

19. A compost aerating apparatus according to claim 10 wherein said apparatus driving means comprises:

a pair of drive wheels, one said drive wheel rotatably connected to each said side of the frame;

a hydraulic motor drivingly connected to each said drive wheel;

a hydraulic pump operatively connected to each said drive wheel hydraulic motor for providing a flow of pressurized fluid thereto; and drive control means communicating with each said hydraulic pump for controlling said pressurized fluid flow to each said drive wheel hydraulic motor, each said drive wheel being reversibly drivable independent of the other for propelling and steering said apparatus.

20. A compost aerating apparatus according to claim 19 wherein said drum driving means comprises a hydraulic pump and a hydraulic motor operatively connected thereto.

21. A compost aerating apparatus according to claim 19 further comprising:

four drive wheels, two said drive wheels rotatably connected to each said side of the frame;

a hydraulic motor drivingly connected to each said drive wheel;

a hydraulic pump operatively connected to each said drive wheel hydraulic motor for providing a flow of pressurized fluid thereto; and drive control means communicating with each said hydraulic pump for controlling said pressurized fluid flow to each said drive wheel hydraulic motor, each said drive wheel being reversibly drivable independent of the other for propelling and steering said apparatus.

22. A compost aerating apparatus according to claim 10 wherein said means for generating a compost entraining air stream is adapted for generating a generally upwardly and transversely directed compost entraining air stream ahead of the drum as the compost aerating apparatus is propelled along the windrow.

23. A compost aerating apparatus according to claim 10 further comprising means for propelling said apparatus sideways.

24. A compost aerating apparatus according to claim 23 wherein said means for propelling said apparatus sideways comprises said drive wheels being pivotably mounted on said frame, said drive wheels being pivotable to a selectable transverse driving position for propelling said apparatus sideways, and further comprising said rear wheels being pivotably mounted on said frame, said rear wheels being pivotable to a transverse position.

25. A compost aerating apparatus according to claim 10 which further comprises means for towing said apparatus.

26. A compost aerating apparatus according to claim 25 wherein said means comprises;

means for supporting a first end of said compost aerating apparatus;

means for retracting said drive wheels and said rear wheels to respective raised positions above an underlying surface;

a dolly;

means for removably connecting said dolly to second end of said frame for supporting a second end of said compost aerating apparatus with said drive and rear wheels above an underlying surface.

27. A compost aerating apparatus according to claim 26 wherein said means for retracting said drive wheels and said rear wheels comprises said drive wheels and said rear wheels being pivotably mounted on said frame, said drive wheels and said rear wheels being pivotable to respective positions between planes coincident with the front and rear of said frame.

28. A compost aerating apparatus according to claim 25 wherein said towing means comprises an extendable frame for removably engaging a first end of the compost aerating apparatus to a truck, and further comprises retractable towing wheels connected to said frame for supporting a second end of said apparatus while being towed.

29. A compost aerating apparatus according to claim 10 which further comprises surfaces defining a chamber for containing said entraining air stream.

30. A compost aerating apparatus according to claim 29 which further comprises means for forming a windrow of mixed and aerated composting material discharged from said entraining air stream.

31. A compost aerating apparatus according to claim 30 wherein said air stream containing chamber and said windrow forming means comprise a transverse top wall disposed above said drum, said top wall having a width less than the length of said drum, and which further comprise a pair of opposed sidewalls joined at their respective upper ends to opposite ends of said top wall, each said sidewall having an angled upper sidewall portion extending downwardly and outwardly from the respective ends of said top wall, and a lower sidewall portion extending substantially vertically downwardly from said angled upper portion.

32. A compost aerating apparatus according to claim 31 wherein said drum is disposed between said opposed sidewall lower portions.

33. A compost aerating apparatus according to claim 31 which further comprises an air inlet opening formed in one or more of said opposed side walls.

34. A compost aerating apparatus according to claim 31 wherein said air stream containing chamber further comprises a front wall and an air inlet opening formed in said front wall.

35. A compost aerating apparatus according to claim 31 wherein said air stream containing chamber and said windrow forming means includes an extended chamber portion comprising an upper surface, a pair of opposed side surfaces, and a downwardly depending end surface.

36. A compost aerating apparatus according to claim 35 wherein said pair of opposed side surfaces and downwardly depending end surface each comprises a sheet formed of a resilient material.

37. A compost aerating apparatus according to claim 35 wherein said extended chamber portion is operable between a first, extended position and a second retracted position.

38. A drum and paddle assembly according to claim 10 which further comprises means for comminuting said composting material.

39. A drum and paddle assembly according to claim 38 wherein said means for comminuting said compost material includes a blade mounted on said drum, the blade including a cutting surface for cutting said composting material when said drum is rotated.

40. A compost aerating apparatus according to claim 10 wherein said first and second drum end portions are journaled in respective first and second opposing frame sides, said first and second end portions being interlockingly engaged with said respective first and second opposed frame sides and adapted for resisting a force acting to spread said respective first and second frame sides.

41. A compost aerating apparatus according to claim 40 wherein said drum first and second end portion each includes a thrust bearing mounted outboard of the respective first and second opposing frame side, each thrust bearing adapted for rotatably bearing on an outboard surface of its respective frame side to resist a force acting to spread the first and second opposing frame sides.

42. An apparatus for mixing and aerating a windrow of material comprising:

a frame having a front, a rear, and first and second opposed sides;

a pair of front wheels rotatably connected to the frame;

a pair of rear wheels rotatably connected to the frame;

an elongate cylindrical drum journaled transversely in the frame, the drum having a longitudinal axis and first and second end portions;

means drivably connected to the drum for rotating the drum at a predetermined rotational speed; and, means for interlockingly engaging said first and second drum end portions with said respective first and second opposed frame sides and means for transmitting a transverse towing force exerted on said apparatus to said first frame side, through said transverse cylinder, and to said second frame side.

43. A compost aerating apparatus according to claim 42 wherein said towing force transmitting means comprises first and second thrust bearings mounted on said first and second drum end portions a respectively.

\* \* \* \* \*